US012308585B1

(12) United States Patent
Mitchell et al.

(10) Patent No.: US 12,308,585 B1
(45) Date of Patent: May 20, 2025

(54) MULTIPLE-CONTACT ELECTRICAL CONNECTOR ASSEMBLY

(71) Applicant: Glenair, Inc., Glendale, CA (US)

(72) Inventors: Daniel McLean Mitchell, Lake Forest, CA (US); G. W. Stewart Clark, Cobourg (CA); Bryan N. Samowitz, Los Angeles, CA (US); Mehrdad Ghara, Aliso Viejo, CA (US); Guido Hunziker, Altadena, CA (US)

(73) Assignee: GLENAIR, INC., Glendale, CA (US)

( * ) Notice: Subject to any disclaimer, the term of this patent is extended or adjusted under 35 U.S.C. 154(b) by 0 days.

(21) Appl. No.: 18/781,483

(22) Filed: Jul. 23, 2024

(51) Int. Cl.

| | |
|---|---|
| ***H01R 24/86*** | (2011.01) |
| ***H01R 4/18*** | (2006.01) |
| ***H01R 13/11*** | (2006.01) |
| ***H01R 13/52*** | (2006.01) |
| *H01R 107/00* | (2006.01) |

(52) U.S. Cl.
CPC ............. *H01R 24/86* (2013.01); *H01R 4/183* (2013.01); *H01R 13/111* (2013.01); *H01R 13/521* (2013.01); *H01R 13/5216* (2013.01); *H01R 2107/00* (2013.01)

(58) Field of Classification Search
CPC ...... H01R 24/86; H01R 4/183; H01R 13/111; H01R 13/521; H01R 13/5216; H01R 2107/00
USPC .......................................................... 439/660
See application file for complete search history.

(56) References Cited

U.S. PATENT DOCUMENTS

| | | | | |
|---|---|---|---|---|
| 8,911,255 | B2 * | 12/2014 | Scherer | H01R 13/6587 439/607.07 |
| 9,368,903 | B1 * | 6/2016 | Keep | H01R 9/18 |
| 9,397,416 | B2 * | 7/2016 | Mostoller | H01R 13/44 |
| 9,645,617 | B2 * | 5/2017 | Martinez | G06F 1/206 |
| 9,680,268 | B1 * | 6/2017 | Finona | H01R 13/622 |
| 9,843,113 | B1 * | 12/2017 | Campbell | H01R 4/32 |
| 9,853,394 | B2 * | 12/2017 | Hamilton-Gahart | H01R 13/533 |
| 9,876,323 | B1 * | 1/2018 | Lybrand | H01R 4/4848 |
| 9,941,622 | B1 * | 4/2018 | Campbell | E21B 17/028 |
| 10,276,969 | B2 * | 4/2019 | Campbell | H01R 43/005 |
| 10,348,037 | B2 * | 7/2019 | Ilie | H01R 13/2457 |
| 10,950,971 | B2 * | 3/2021 | Lapierre | H01R 13/443 |
| 11,069,997 | B1 * | 7/2021 | Taylor | H01R 13/6392 |
| 2003/0236030 | A1 * | 12/2003 | McCormack, III | H01R 13/5216 439/587 |

(Continued)

*Primary Examiner* — Alexander Gilman
(74) *Attorney, Agent, or Firm* — David S. Alavi

(57) ABSTRACT

An electrical connector assembly includes a connector body, electrical connector contacts mounted in the connector body, and electrical wire contacts attached to wires of an electrical cable. Rear ends of the connector contacts (either contact pins or sockets) engage front ends of the wire contacts (either contact sockets or pins). A head of each contact pins is wider than its shaft resulting in a protruding edge. Each contact socket receives the corresponding contact pin. At least one resilient retaining member extends obliquely into and at least partly across each contact socket away from its open end and is deflected laterally as the contact pin is inserted into the contact socket. Upon full insertion the retaining member presses laterally against the shaft and a distal edge of the retaining member obstructs withdrawal of the contact pin from the contact socket by engaging the protruding edge.

34 Claims, 14 Drawing Sheets

(56) References Cited

U.S. PATENT DOCUMENTS

| | | | | |
|---|---|---|---|---|
| 2006/0068644 | A1* | 3/2006 | Zauber | H01R 13/533 439/654 |
| 2013/0196555 | A1* | 8/2013 | Scherer | H01R 13/6463 439/686 |
| 2013/0206474 | A1* | 8/2013 | Skrypka | H01R 24/20 174/88 R |
| 2014/0011392 | A1* | 1/2014 | Barnard | H01R 13/18 439/382 |
| 2015/0111443 | A1* | 4/2015 | Gutenschwager | H01R 43/26 29/882 |
| 2016/0056551 | A1* | 2/2016 | Mostoller | H01R 4/4833 439/131 |
| 2018/0166838 | A1* | 6/2018 | Lybrand | H01R 13/28 |

* cited by examiner

MULTIPLE-CONTACT ELECTRICAL CONNECTOR ASSEMBLY

FIELD OF THE INVENTION

The field of the present invention relates to electrical connectors. In particular, multiple-contact electrical connectors with mating connector and wire contacts are disclosed herein.

BACKGROUND

In some conventional electrical connectors, individual wires of a multi-conductor cable are soldered one-by-one into corresponding solder cups of the electrical contacts of the connector, establishing both electrical contact and mechanical retention for each wire of the cable. The soldering process is tedious and time-consuming. Other conventional electrical connectors include an interior contact pin for each connector contact, and a mating contact socket crimped onto each wire of the cable. Insertion of each interior contact pin into a corresponding crimped-on contact socket establishes electrical continuity. The connector assembly includes additional structural elements (e.g., a so-called backpack socket insulator assembly) to provide mechanical retention of the contact sockets on the interior contact pins, increasing the size, weight, and cost of the connector assembly.

SUMMARY

An electrical connector assembly includes a connector body, one or more electrical connector contacts, and one or more electrical wire contacts. Each electrical connector contact is rigidly mounted in the connector body, and includes an intermediate portion arranged for securing the electrical connector contact to the connector body within the electrical connector assembly. Each electrical connector contact also includes a front end arranged for engaging a mating contact of a second, mating electrical connector assembly, and a rear end arranged for engaging a front end of a corresponding one of the electrical wire contacts. Each electrical wire contact includes the front end thereof that is arranged for engaging the rear end of the corresponding electrical connector contact, and a rear end arranged for attachment to an end of a corresponding one of multiple electrical wires of an electrical cable. Either the rear ends of the connector contacts comprise corresponding contact pins while the front ends of the wire contacts comprise corresponding contact sockets, or vice versa.

Each contact pin includes a shaft portion and a head portion; the head portion has a tapered end and is wider than the shaft portion resulting in a protruding edge where the head portion joins the shaft portion. Each contact socket has an open end and is sized and shaped to receive therein the corresponding contact pin through the open end; one or more resilient retaining members extend obliquely into and at least partly across the contact socket away from its open end. With the contact pin partially inserted into the corresponding contact socket the head portion deflects the one or more retaining members laterally toward a side of the contact socket, allowing passage of the head portion past the one or more retaining members. With the contact pin fully inserted into the corresponding contact socket the one or more retaining member press laterally against the shaft portion of the contact pin; corresponding distal edges of the one or more retaining members obstruct withdrawal of the contact pin from the corresponding contact socket by engaging the protruding edge of the contact pin.

The electrical connector assembly can include the electrical cable including its multiple electrical wires thereof, with each electrical wire contact attached at its rear end to an end of a corresponding electrical wire protruding from the exterior insulation of the electrical cable. Each electrical wire contact can be engaged at the front end thereof with the rear end of the corresponding electrical connector contact.

Objects and advantages pertaining to electrical connectors may become apparent upon referring to the example embodiments illustrated in the drawings and disclosed in the following written description or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically; all features may not be shown in full detail or in proper proportion; for clarity certain features or structures may be exaggerated or diminished relative to others or omitted entirely; the drawings should not be regarded as being to scale unless explicitly indicated as being to scale. The embodiments shown are only examples and should not be construed as limiting the scope of the present disclosure or appended claims.

DETAILED DESCRIPTION

The following detailed description should be read with reference to the drawings, in which identical reference numbers refer to like elements throughout the different figures. The drawings, which are not necessarily to scale, depict selective examples and are not intended to limit the scope of the inventive subject matter. The detailed description illustrates by way of example, not by way of limitation, the principles of the inventive subject matter.

It would be desirable to provide a multiple-contact electrical connector assembly employing a corresponding pair of a pin and a socket for connecting each wire of an electrical cable to a corresponding contact of the electrical connector assembly, in which engagement of each pin/socket pair provides both (i) electrical connection between the corresponding wire and contact and (ii) mechanical retention of the pin engaged within the socket. Such an arrangement would not require soldering, and would not require an additional structure or element (such as a backpack socket insulator assembly) for retaining each pin within the corresponding socket.

Figure 1A:
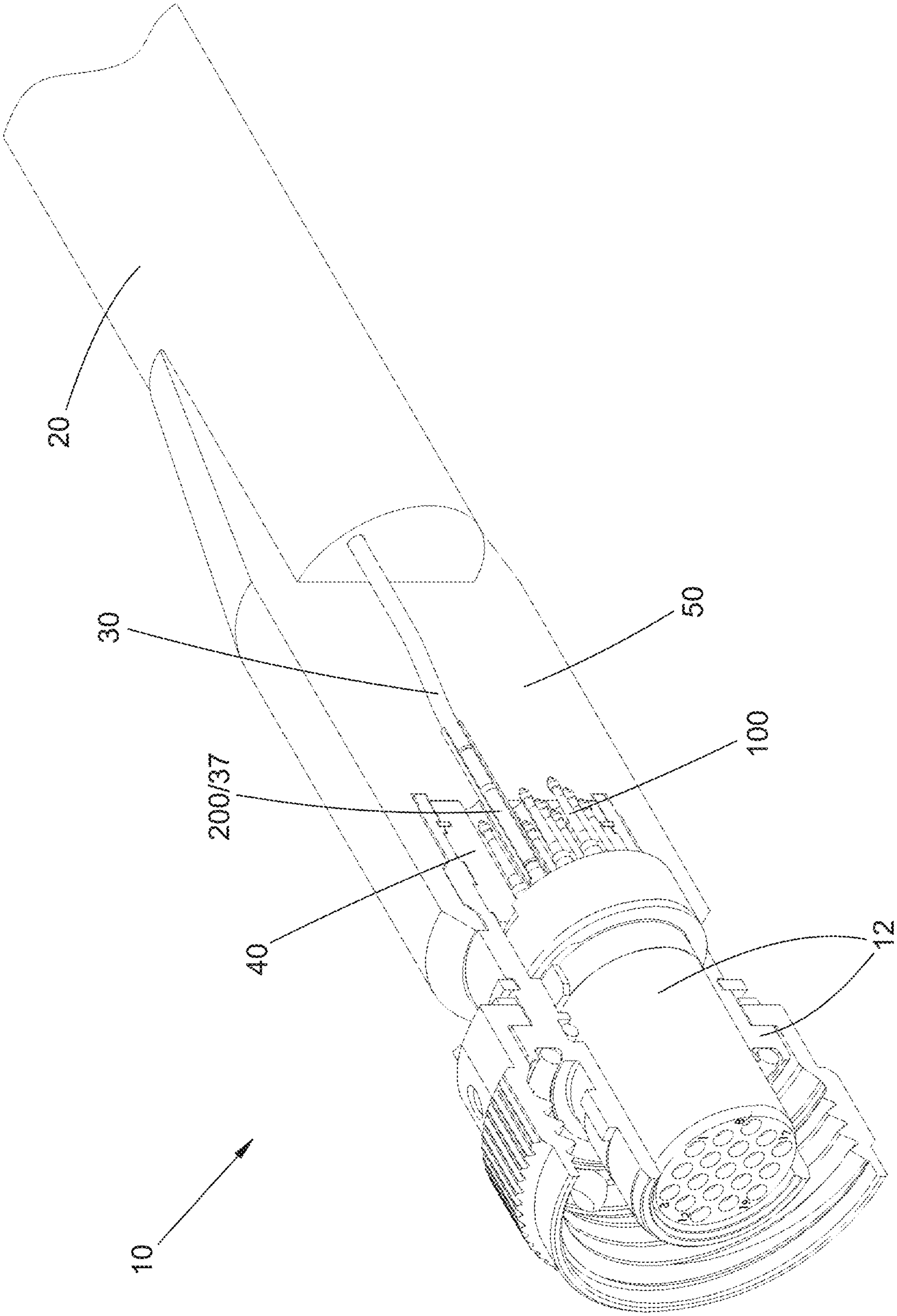
FIGS. 1A and 1B are partially cut-out views of a first example of an electrical connector assembly with multiple connector sockets.
Figure 1B:
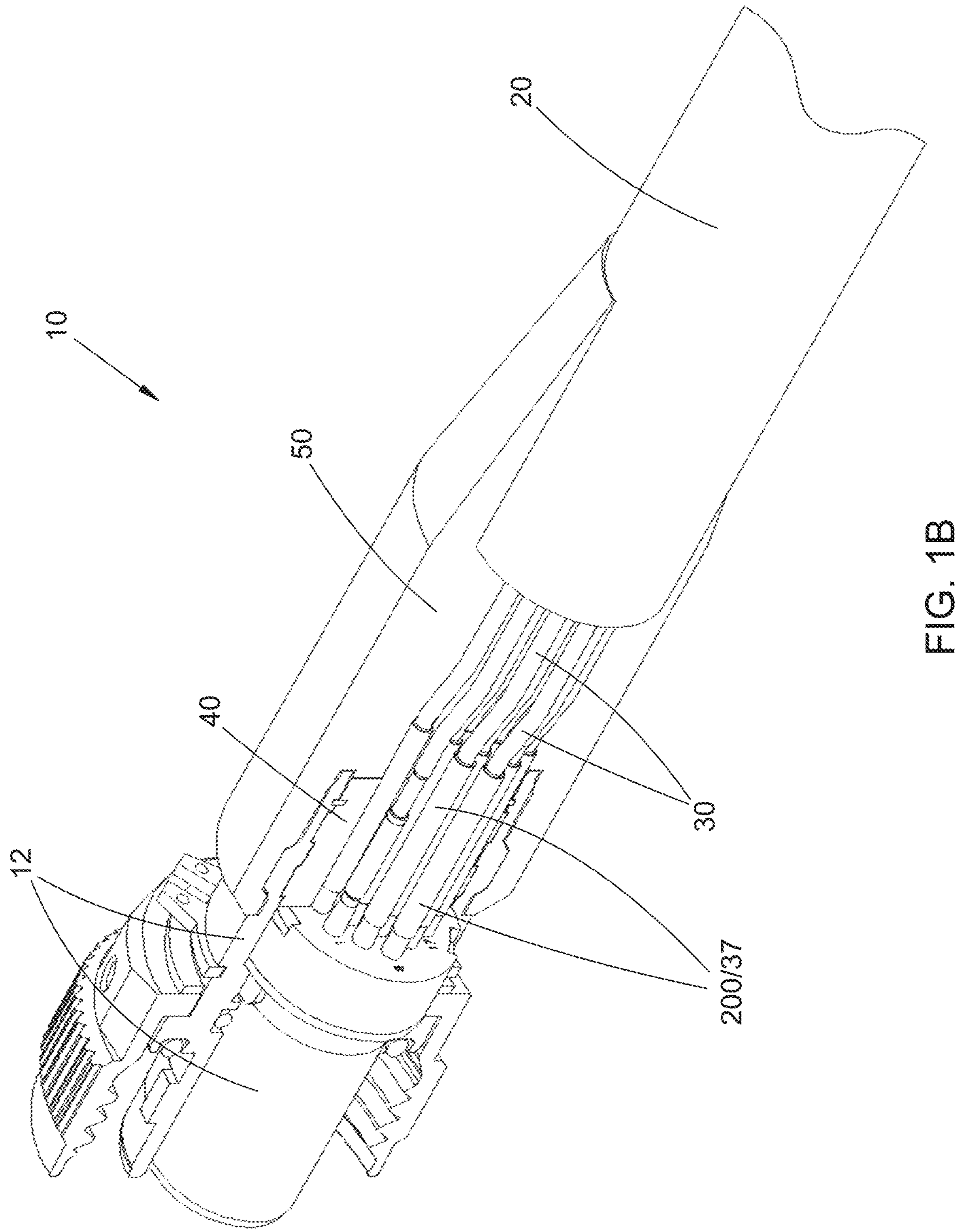
Figure 2B:
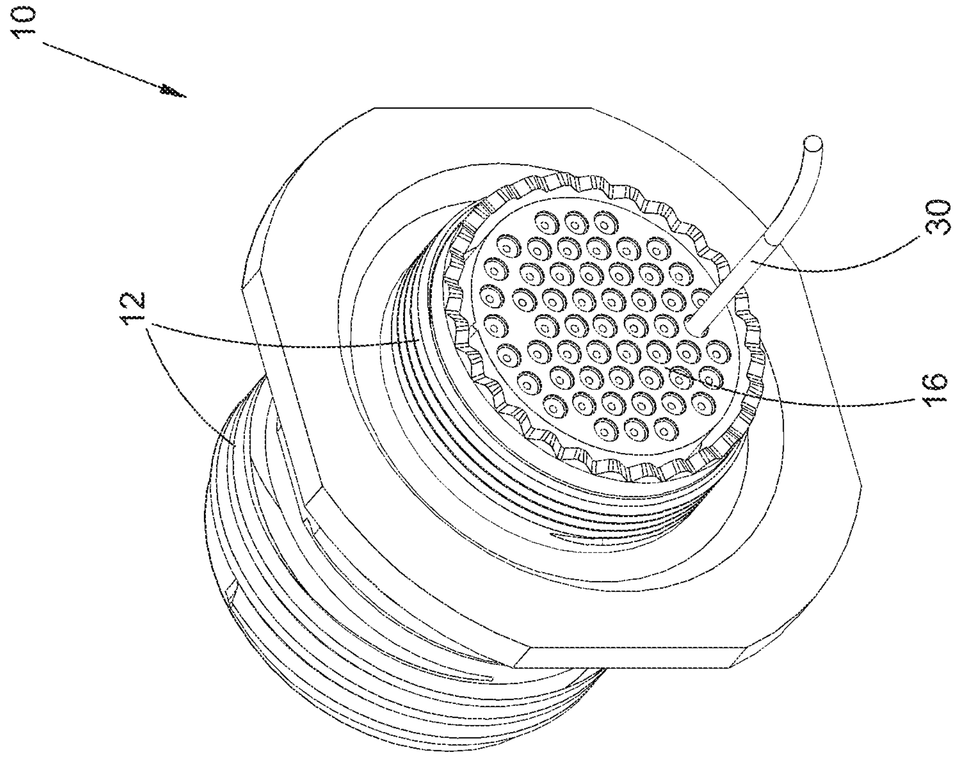
FIGS. 2A and 2B are perspective views of a second example of an electrical connector assembly with multiple connector pins.
Figure 2A:
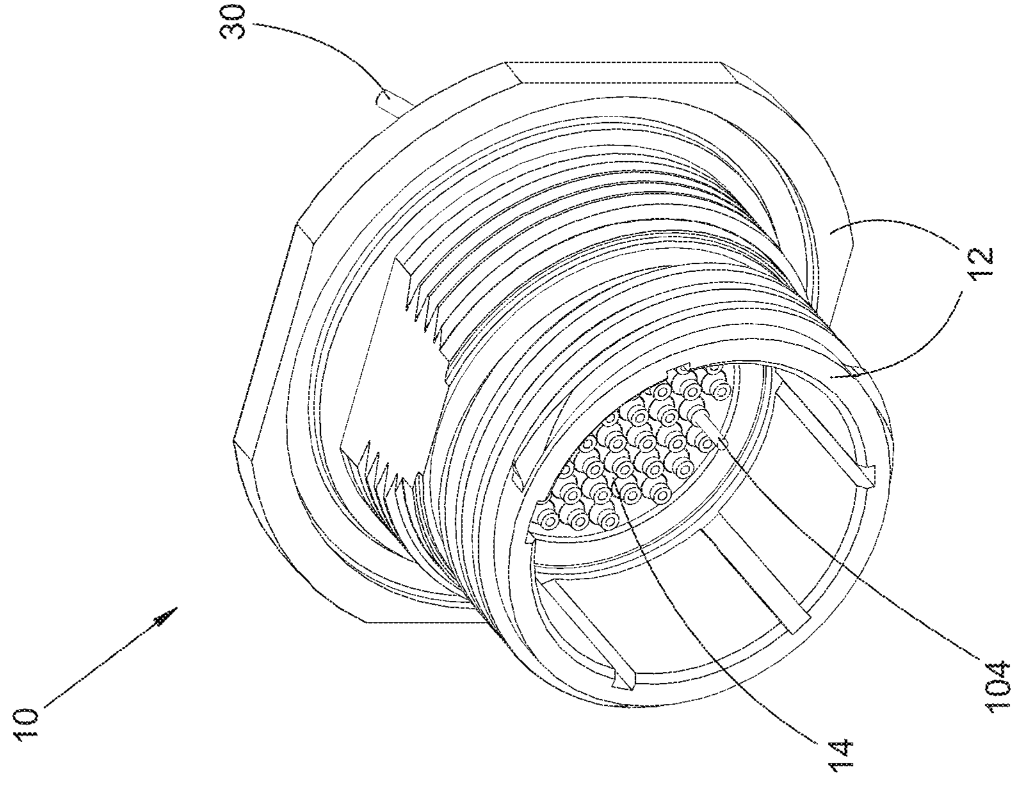
Figures 3A, 3B:
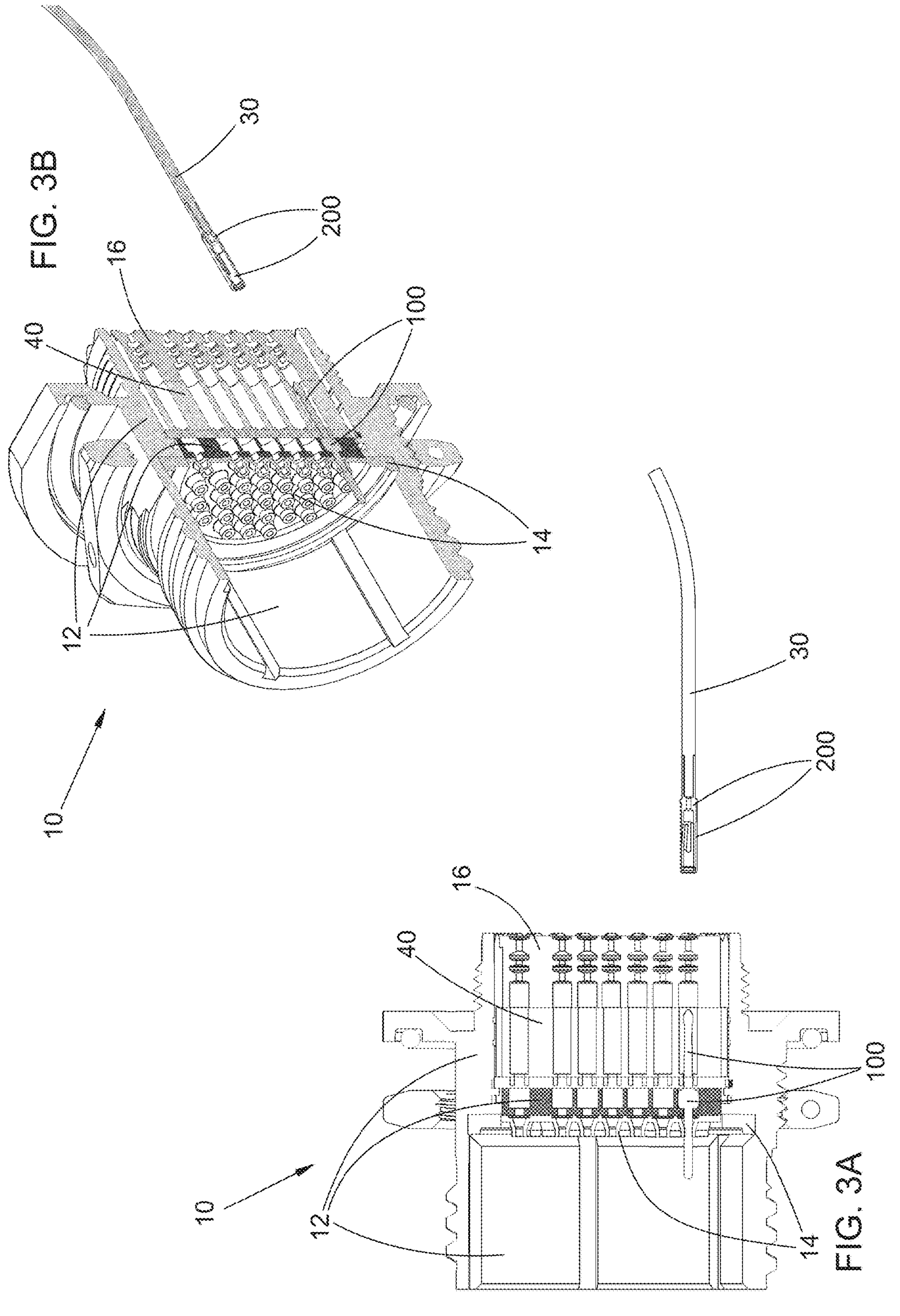
FIGS. 3A and 3B are side and perspective cross-sectional views, respectively, of the connector assembly of FIGS. 2A and 2B before connecting a wire.
Figure 4B:
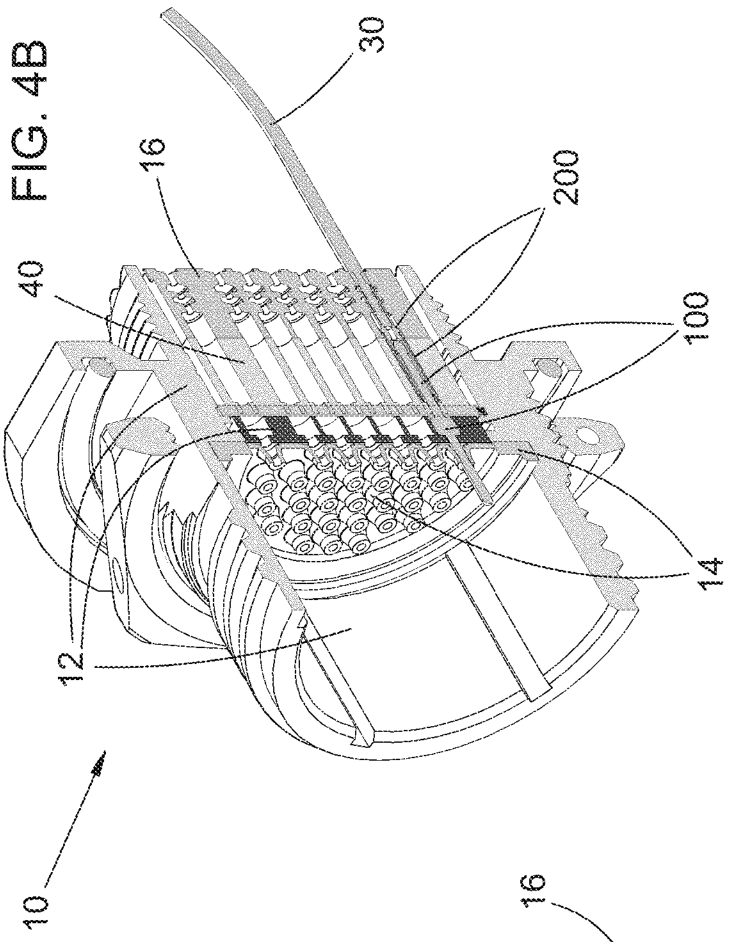
FIGS. 4A and 4B are side and perspective cross-sectional views, respectively, of the connector assembly of FIGS. 2A and 2B after connecting the wire.
Figure 4A:
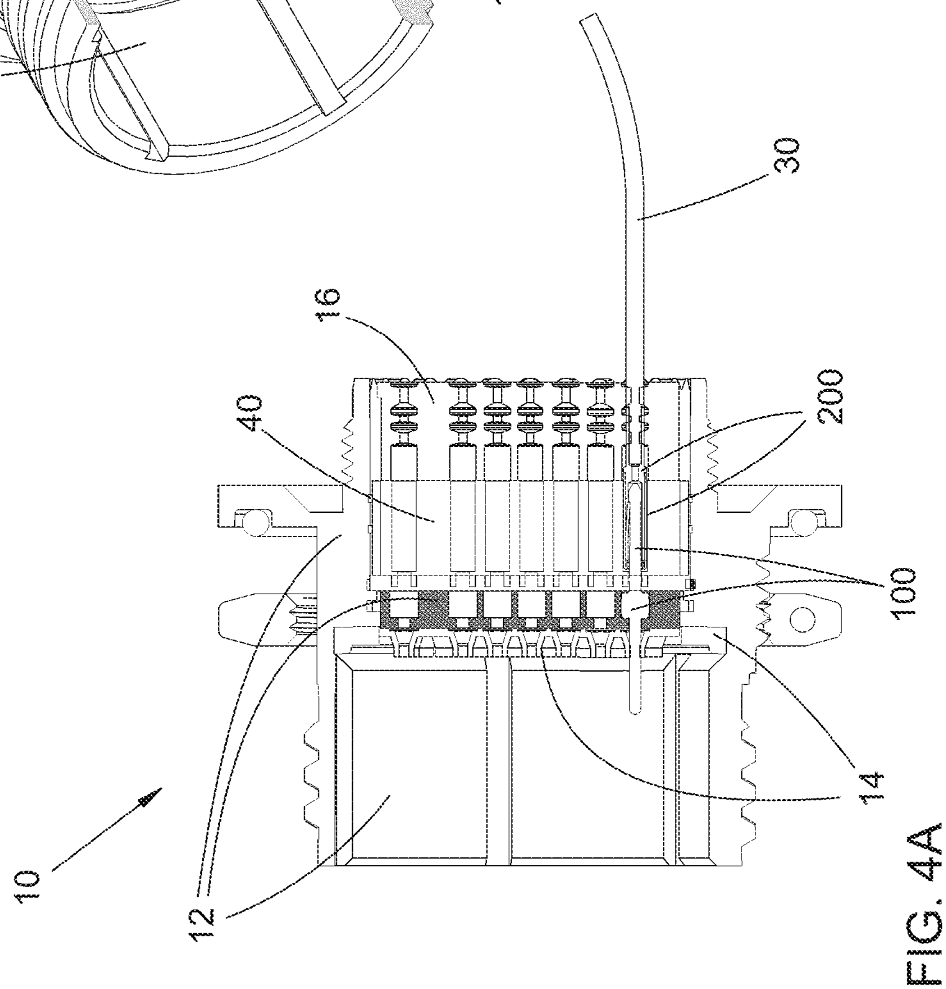

Accordingly, an electrical connector assembly 10 includes a connector body 12, one or more electrical connector contacts 100 rigidly mounted in the connector body 12; and one or more electrical wire contacts 200. In many examples, the electrical connector assembly includes a set of multiple electrical connector contacts 100 and a corresponding set of multiple electrical wire contacts 200. FIGS. 1A and 1B show an example of a circular connector assembly 10 with multiple connector sockets; FIGS. 2A and 2B, 3A and 3B, and 4A and 4B show an example of a circular connector assembly 10 with multiple connector pins. The connector body 12 can be of any suitable size, shape, arrangement, materials, or form factor, and often can include a rigid outer shell arranged for mechanical engagement (e.g., with a support or mounting structure or panel, or with a mating connector assembly), and an insert portion that holds electrically conductive components of the connector assembly 10 in their proper positions (e.g., any suitable number of electrical connector contacts 100). In some examples that include distinct outer shell and insert portions, the outer shell can include metallic material(s) and the insert portion can include electrically insulating material(s). In some examples the insert portion can "float" relative to the outer shell, to provide mechanical strain relief when the connector assembly 10 is connected to a mating connector assembly. The number of electrical connector contacts 100 in the connector assembly 10 typically would match the number of electrical wires 30 in an electrical cable 20 to which the electrical connector assembly 10 is to be attached, for connecting that electrical cable 20 to another, mating electrical connector (not shown). In some examples the connector body 12 can be arranged as a MIL-DTL-38999 circular connector; in some other examples the connector body can be arranged as a MIL-DTL-24308 rectangular or D-shaped connector; any other suitable connector type, shape, or arrangement can be employed.

Figure 5B:
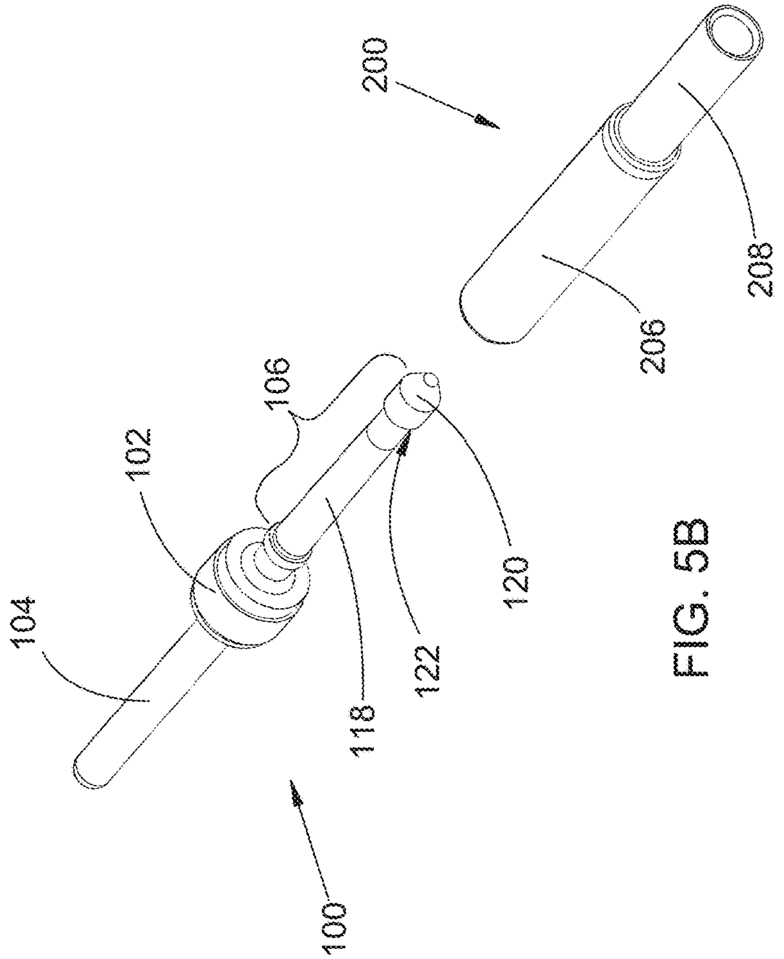
FIGS. 5A and 5B are front and rear perspective views of an electrical connector contact and an electrical wire contact.
Figure 5A:
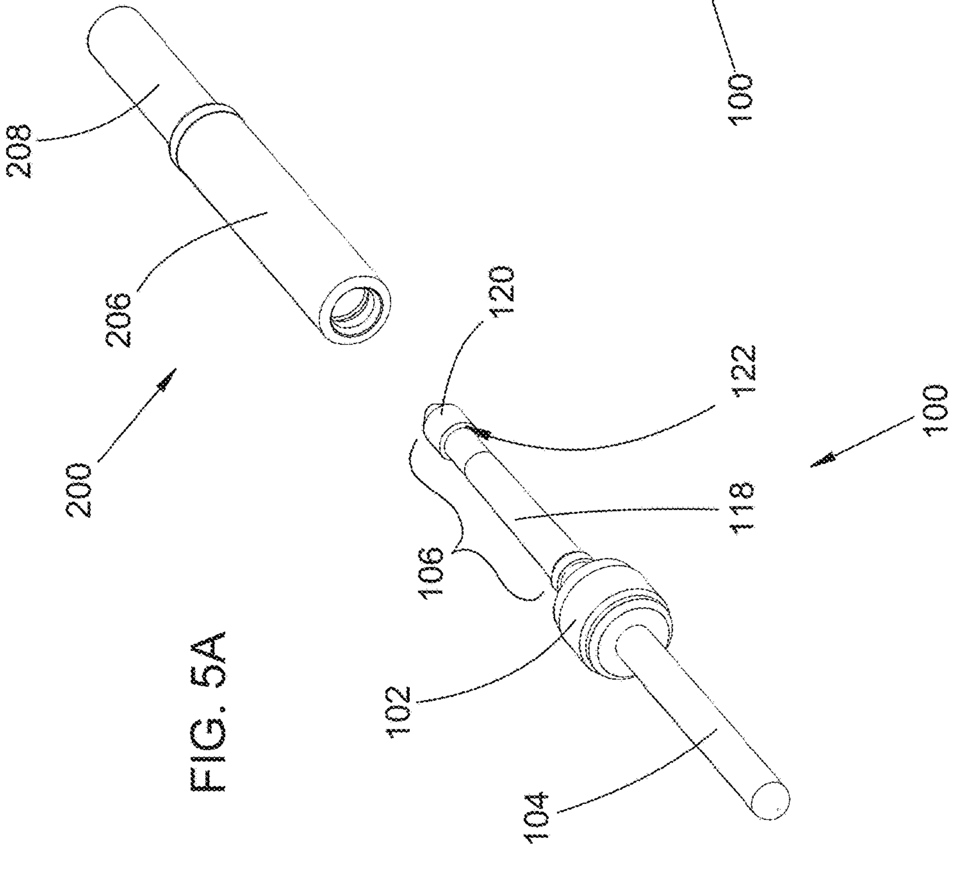
Figure 6C:
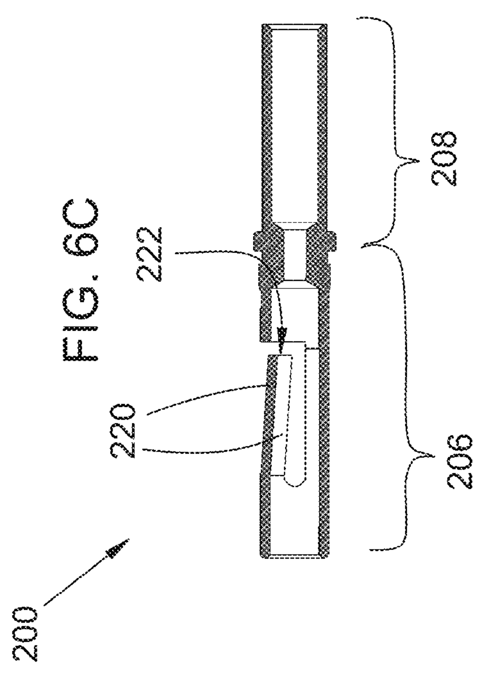
FIGS. 6A, 6B, and 6C are side, top, and side cross-sectional views, respectively, of an insert portion of a contact socket of the electrical wire contact.
Figure 6D:
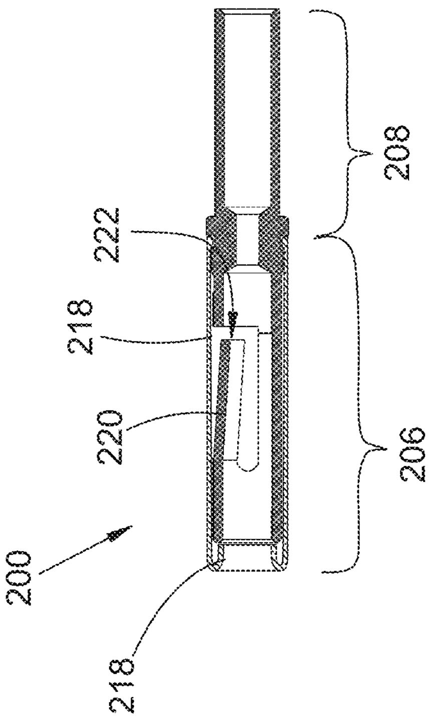
FIG. 6D is a side cross-sectional view of the insert portion assembled with an outer sleeve of the contact socket.
Figure 6A:
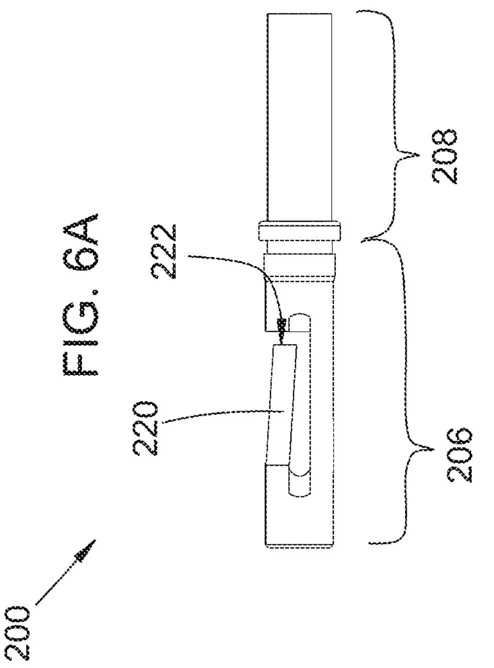
Figure 6B:
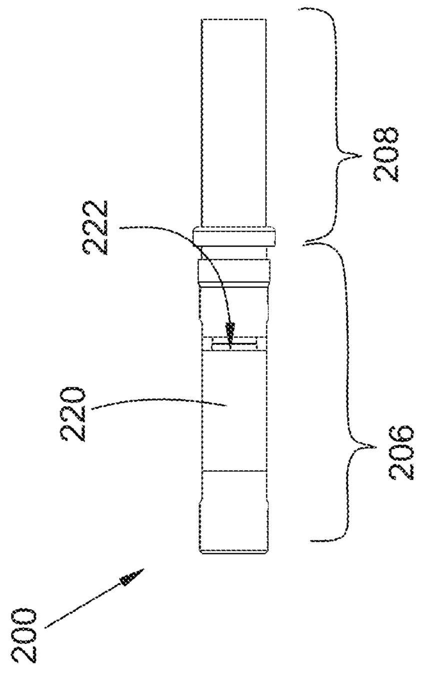

Each electrical connector contact 100 (e.g., as in FIGS. 5A and 5B) includes a front end 104 and a rear end 106 with an intermediate portion 102 between them. The directions "front" and "rear" are defined relative to the end of the cable 20 and the connector assembly 10 connected thereto. "Rear" is the direction back along the cable 20 away from the connector assembly 10 at the cable end; "forward" is the direction from the end of the cable 20 toward a mating connector to which the connector assembly 10 is to be attached in normal use. The intermediate portion 102 can be structurally arranged in any suitable way to secure the electrical connector contact 100 to the connector body 12 within the electrical connector assembly. In some examples the intermediate portion 102 can include, e.g., one or more grooves, flanges, pins, holes or recesses, and so forth, for securing the electrical connector contact 100 to the connector body 12. The front end 104 of each connector electrical contact 100 can be structurally arranged in any suitable way to engage a mating contact of a second, mating electrical connector assembly (not shown). In some examples (e.g., FIGS. 1A and 1B) the front ends 104 of the connector electrical contacts 100 can be arranged as connector sockets of the electrical connector assembly 10; in some other examples (e.g., FIGS. 2A through 5B) the front ends 104 of the electrical connector contacts 100 can be arranged as connector pins of the electrical connector assembly 10. Each electrical wire contact 200 includes a rear end 208 that can be structurally arranged in any suitable way to be attached to an end of a corresponding electrical wire 30 of an electrical cable 30. In some examples that rear end 208 can be arranged to be crimped onto the end of the wire 30 from which a length of the wire insulation 34 has been stripped; in some examples that rear end 208 can be arranged to be soldered onto the end of the wire 30 from which a length of the wire insulation 34 has been stripped. Any suitable attachment of the rear ends 208 of the electrical wire contacts 200 to corresponding wires 30 can be employed. The electrical connector contact 100 and the electrical wire contact 200 can include any one or more suitable electrically conductive materials. Metals or metal alloys are often employed, e.g., copper, beryllium copper, phosphor bronze, aluminum, and so forth; in some examples the contact pin or contact socket can be plated with a more conductive metal or alloy, such as gold.

The rear end 106 of the electrical connector contact 100 and the front end 206 of the electrical wire contact 200 are arranged to engage one another to establish electrical continuity and for mechanical retention in the engaged arrangement. In some examples (including those examples shown in the drawings) the rear end 106 of each electrical connector contact 100 is arranged as a contact pin and the front end 206 of each electrical wire contact 200 is arranged as a contact socket. In some other examples (not shown in the drawings) the front end 206 of each electrical wire contact 200 is arranged as a contact pin and the rear end 106 of each electrical wire contact 100 is arranged as a contact socket. The following description of the contact pins and contact sockets shall apply to both of those arrangements.

Figure 7A:
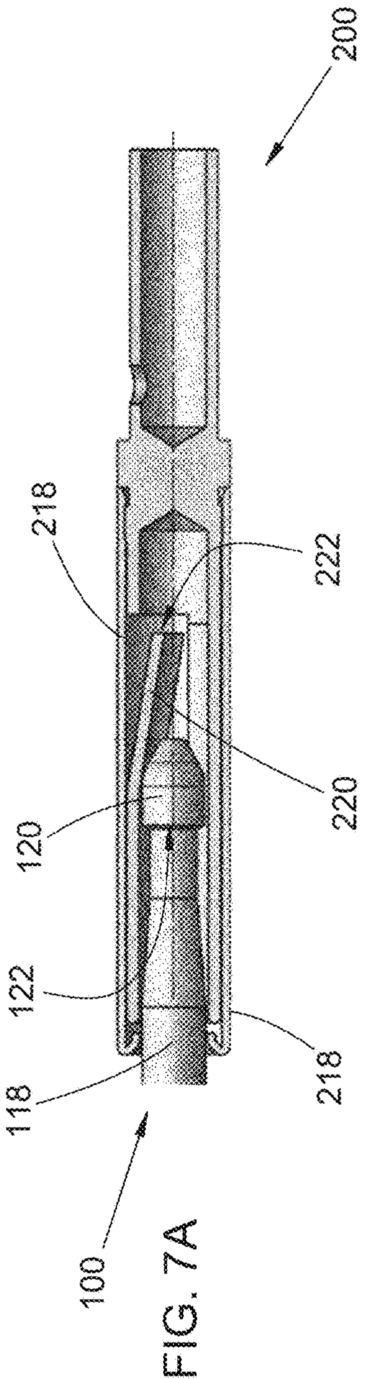
FIGS. 7A-7C are side cross-sectional views illustrating insertion and engagement of a contact pin of an electrical connector contact into a contact socket of an electrical wire contact.
Figure 7B:
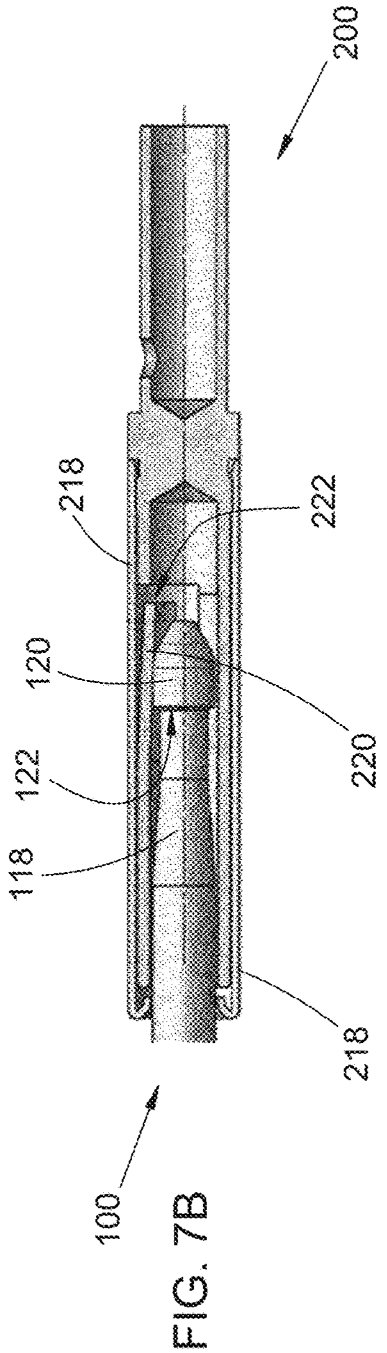
Figure 7C:
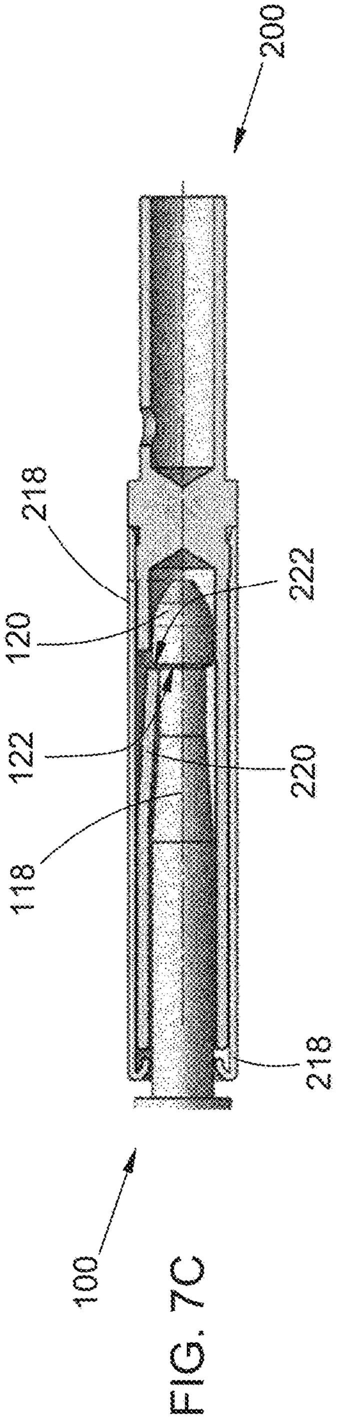
Figure 8C:
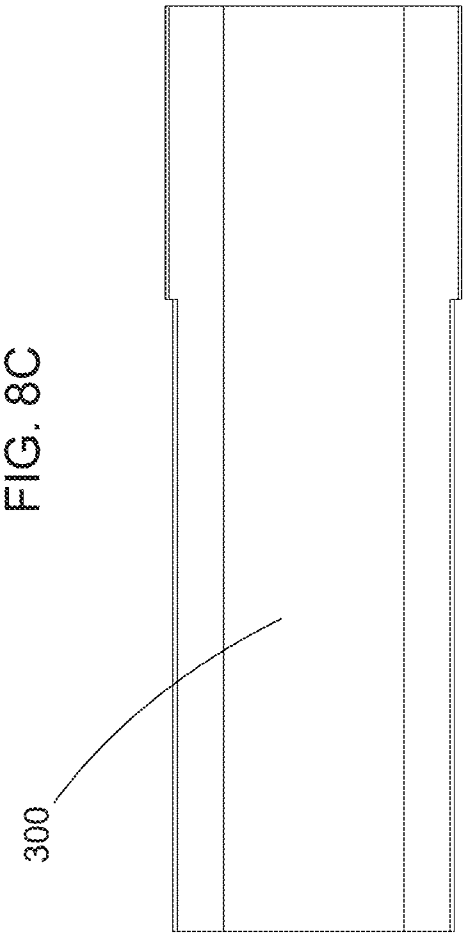
FIGS. 8A-8D are end, side, top, and perspective views of an electrically insulating lateral spacer arranged to engage two electrical wire contacts.
Figure 8B:
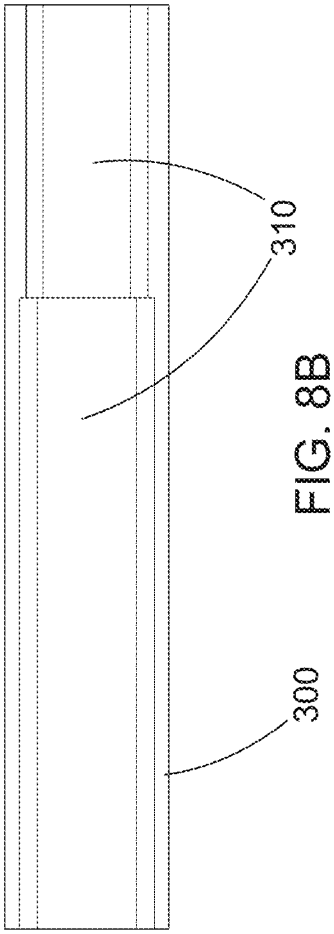
Figure 8A:
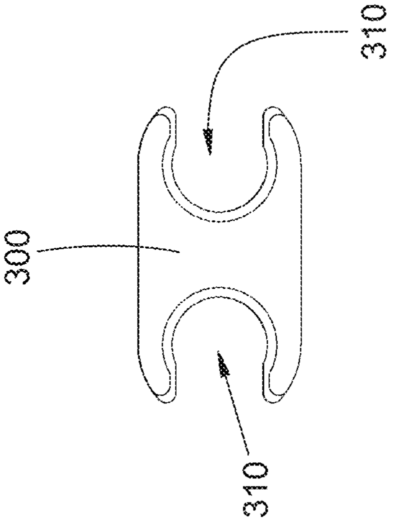
Figure 8E:
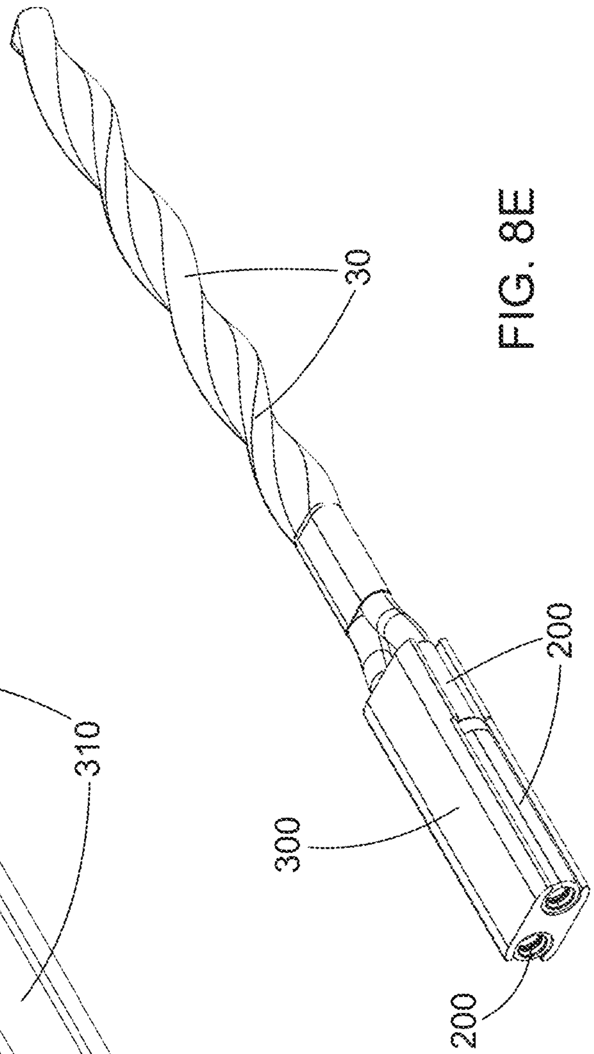
FIG. 8E is a perspective view of two electrical wire contacts connected to a twisted pair of wires and engaged with the lateral spacer.
Figure 8D:
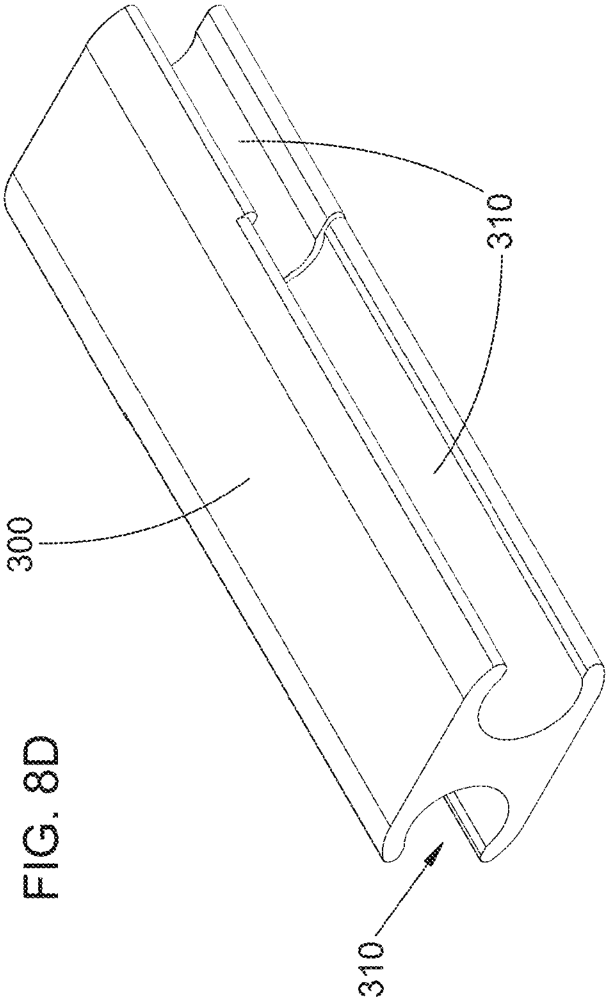
Figures 9A, 9B, 9C, 9D:
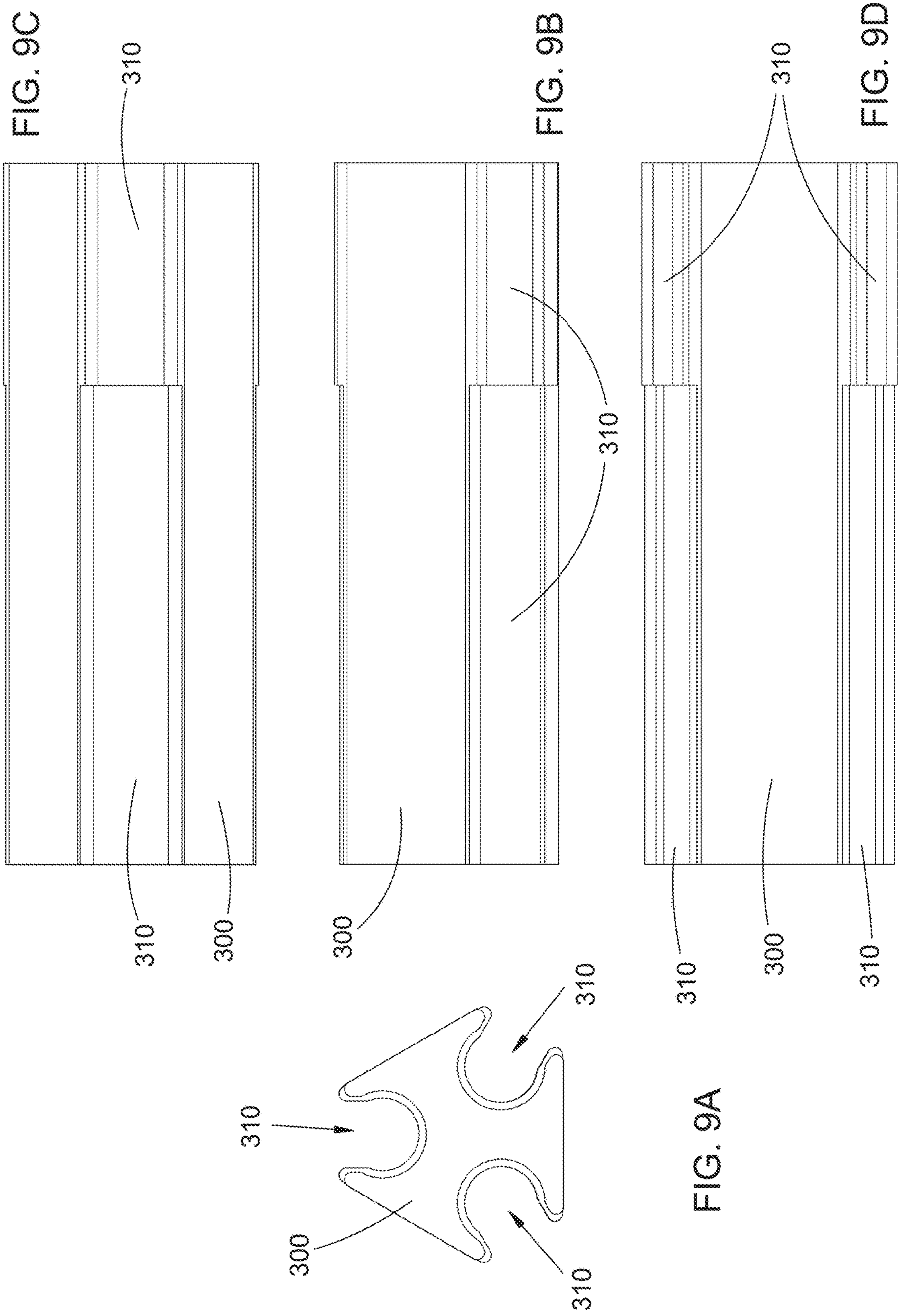
FIGS. 9A-9E are end, side, top, bottom, and perspective views of an electrically insulating lateral spacer arranged to engage three electrical wire contacts.
Figure 9F:
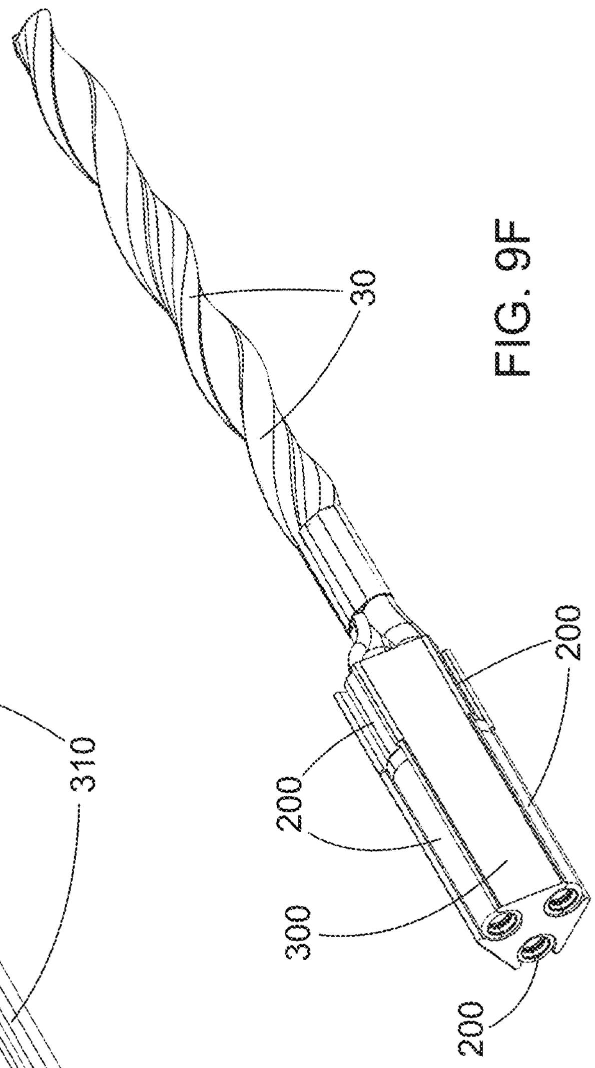
FIG. 9F is a perspective view of three electrical wire contacts connected to a twisted pair of wires and a drain wire thereof and engaged with the lateral spacer.
Figure 9E:
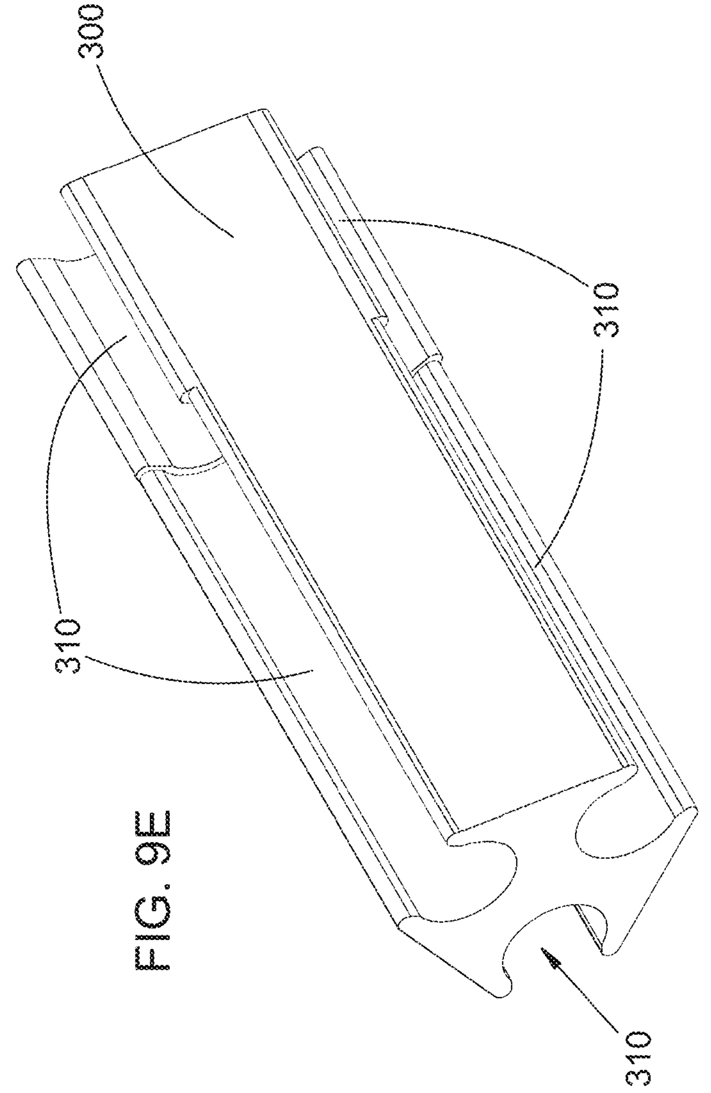
Figures 10A, 10B, 10C, 10D:
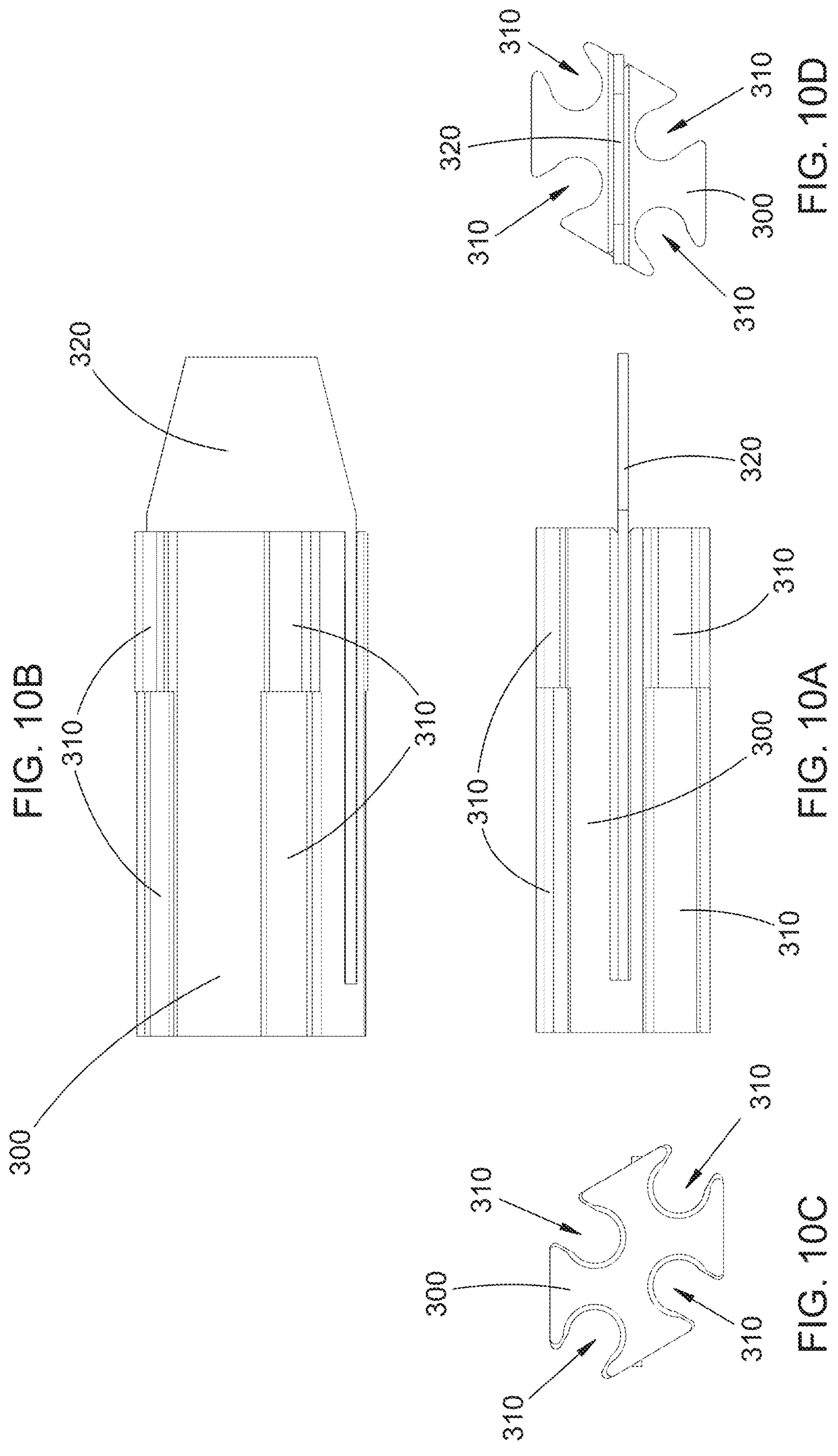
FIGS. 10A-10E are front end, side, top, rear end, and perspective views of an electrically insulating lateral spacer arranged to engage four electrical wire contacts and including an electrically conductive shield.
Figure 10F:
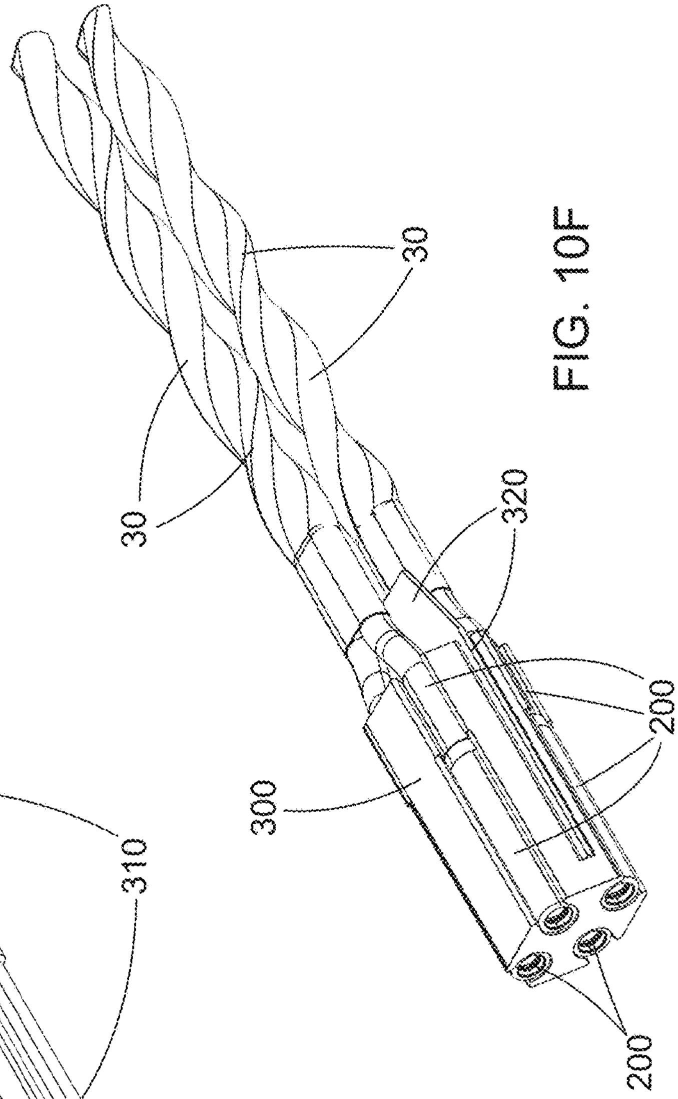
FIG. 10F is a perspective view of four electrical wire contacts connected to two twisted pairs of wires and engaged with the lateral spacer, separated by the conductive shield.
Figure 10E:
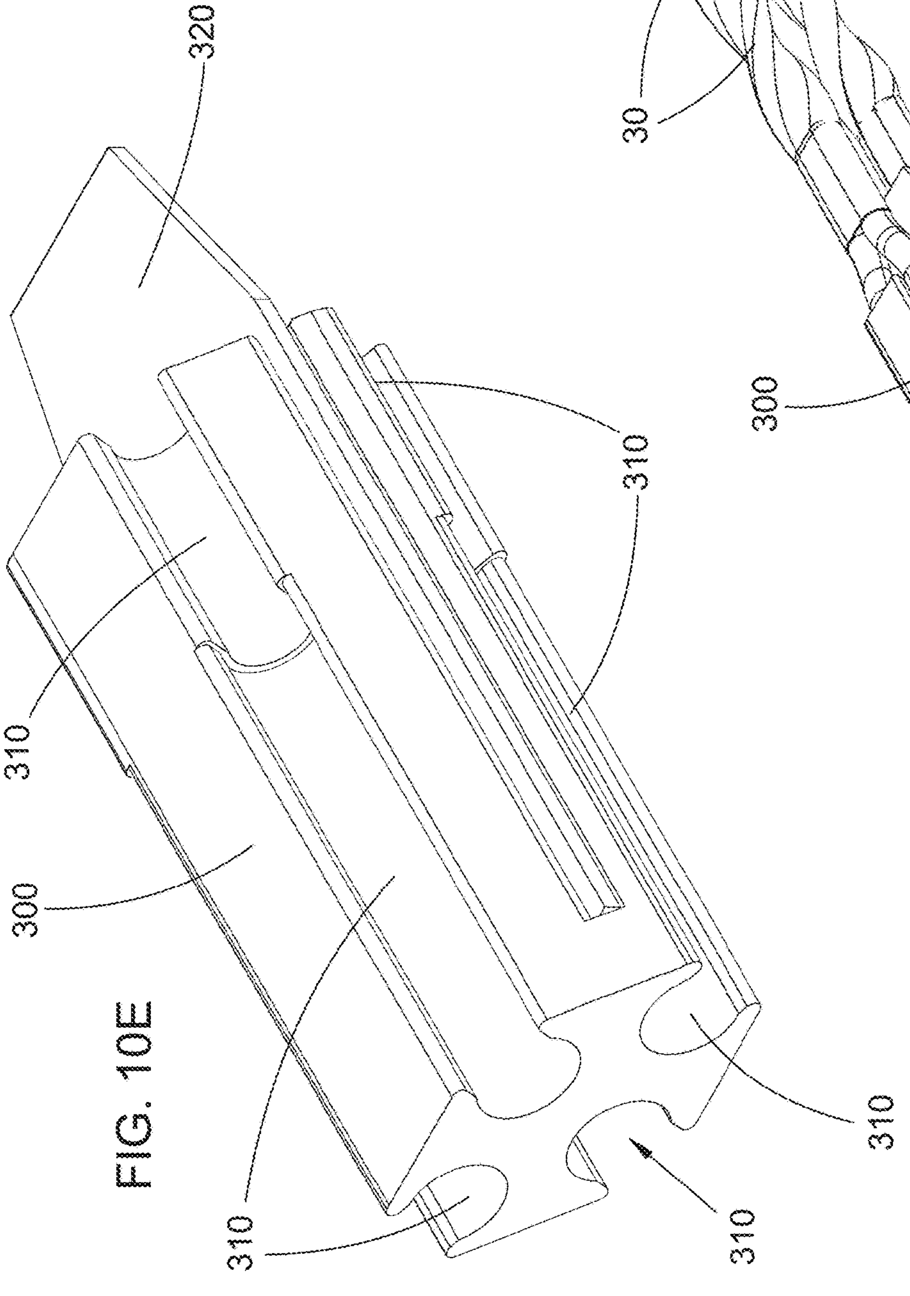

Each contact pin (e.g., as in FIGS. 5A and 5B) includes a shaft portion 118 and a head portion 120. The head portion 120 has a tapered end to facilitate insertion of the contact pin into the corresponding contact socket (e.g., as in FIG. 7A). The head portion 120 is wider than the shaft portion 118, thus forming a protruding edge 122 where the head portion 120 joins the shaft portion 118. Each contact socket (e.g., as shown in FIGS. 5A, 5B, and 6A-6D) has an open end and is sized and shaped to receive therein the corresponding contact pin through the open end. Each contact socket includes one or more corresponding resilient retaining members 220 that extend obliquely into and at least partly across the contact socket away from its open end. The examples shown include a single retaining member 220 within each contact socket. Some other examples can include multiple retaining members 220 within each contact socket, arranged circumferentially around or longitudinally along the contact socket (or both); such examples might be advantageously employed, e.g., for larger contact pins and contact sockets. During insertion of the contact pin into the contact socket (e.g., as in FIG. 7B), the retaining member 220 is deflected laterally (elastic deformation) toward a side of the contact socket by the head portion 120, which enables the head portion to slide past the retaining member 220. Upon reaching full insertion (e.g., as in FIG. 7C), the retaining member 220 presses laterally against the shaft portion 118 of the contact pin, ensuring good electrical contact between the contact pin and the contact socket. The distal edge 222 of the retaining member 220 (i.e., the edge 222 of the free end of the retaining member 220 farthest from the open end of the contact socket) obstructs withdrawal of the contact pin from the corresponding contact socket by engaging the protruding edge 122 of the contact pin. The arrangement of the contact pin and the contact socket therefore provides both electrical continuity as well as mechanical retention of the contact pin and contact socket engaged with each other.

In some examples the shaft portion 118 of the contact pin can include a tapered section that tapers toward the head portion 120, so that the shaft portion 118 is narrowest where it joins that head portion 120. In some examples each contact socket 200 can include a corresponding outer sleeve 218 and a corresponding insert portion positioned within the outer sleeve 218. In some examples the insert portion can be arranged as an inner sleeve with a partially cut-out portion bent across the inner sleeve to form the corresponding obliquely extending retaining member 220 (e.g., as in FIGS. 6A-6D). A U-shaped cut, with the open end of the "U" pointed toward the open end of the contact socket, can yield a tang that serves as the retaining member 220. The material of the inner sleeve can be bent (i.e., plastically deformed) at the base of the tang so that it extends obliquely into and at least partly across the inner sleeve, thereby forming the retaining member 220 (e.g., as in FIG. 7A). Any other suitable type or arrangement of the retaining member 220 can be employed, e.g., as a separate component such as a clip secured in any suitable way within the contact socket (or outer sleeve 218 if present).

Whatever the structure or arrangement of the retaining member 220, as the contact pin is inserted into the contact socket (e.g., as in FIG. 7B), the head portion 120 of the contact pin deflects the retaining member 220 laterally toward a side of the contact socket (elastic deformation), enabling the head portion 120 to move past the retaining member 220. With full insertion of the contact pin into the contact socket (e.g., as in FIG. 7C), the retaining member 220 is still deflected laterally by the shaft portion 118 of the contact pin, although less than by the head portion 120. The resulting elastic restoring force presses the retaining member 220 against the shaft portion 118, ensuring good electrical contact between the contact pin and the contact socket.

Structural arrangements of the head portion 120 of the contact pin and the retaining member 220 of the contact socket (e.g., size or slope or curvature of the protruding edge 122, stiffness of the retaining member 220, shape or curvature of the distal edge 222, circumferential extent of the retaining member 220) can determine several performance characteristics. In some examples the structural arrangements result in an audible or tactile cue (e.g., a click that can be heard or felt) as the head portion 120 moves past the retaining member 220, which can then snap back against the shaft portion 118. Such an audible or tactile cue can guide assembly of the contact sockets onto the contact pins, giving a discernable indication that those components are properly engaged.

In some examples the structural arrangements of the contact pin and contact socket can allow removal of the contact pin from the contact socket even after engagement of the protruding edge 122 of the contact pin with the distal edge 222 of the retaining member 220. The contact pins and contact sockets are typically intended for one-time assembly; after all connections are made between the wires 30 of the cable 20 and the contacts of the connector assembly 10, the interior of the connector assembly 10 can be, e.g., sealed (such as by using a front seal 14 or a back seal 16 or both) or filled with a potting material 40 that encapsulates the engaged contact pins and contact sockets (e.g., as in FIGS. 3A, 3B, 4A, and 4B); in some examples shrink tubing 37 or other similar seal can be applied over each of the engaged contact pin and contact socket pairs (e.g., as in FIGS. 1A and 1B). However, during assembly occasional mis-wiring can occur, i.e., the electrical wire contact 200 connected to one of the wires 30 might be engaged with the wrong electrical connector contact 100. In such instances it can be advantageous if such a mis-connected pair of contacts 100 and 200 could be disengaged. Suitable arrangement of the protruding edge 122 and the retaining member 220 can in some examples allow such removal if sufficient force is applied. In some examples the removal force can be less than the force required to pull the wire 30 out of the crimped rear end 208 of the electrical wire connector (i.e., the crimp tensile force); standards for that crimp tensile force are specified, e.g., in standards such as MIL-DTL-39029 or AS39029. In some examples the removal force required to disengage the contact socket from the engaged contact pin can be larger than the force required for insertion and engagement.

In some examples the contact pin or contact spacer can be structurally adapted to enable partial insertion and engagement, permitting testing of the connections between the wires 30 (with the electrical wire contacts 200) and the corresponding electrical connector contacts 100. In some such examples, multiple retaining members 220 can be employed at different longitudinal positions along the contact socket. Those multiple retaining members 220 can be arranged so that a first one that engages the protruding edge 122 (upon partial insertion) does so with less retaining force than a second one (upon full insertion). Each electrical wire contact 200 can be thus partially engaged with the corresponding electrical connector contact 100 and the connections to the wires 30 tested. Any erroneous connections can be readily unmade and remade correctly, due to the reduced removal force required from the partially engaged arrangement. Once it is determined that the connections are correct, each contact pin can then be fully inserted into, and fully engaged with, the corresponding contact socket. The removal force required from the fully engaged arrangement would be larger than that required from the partially engaged arrangement.

A similar result can be achieved by providing a second, shallower protruding edge on the head portion of each contact pin. The second edge can be positioned closer to the end of the contact pin than the edge 122, so that upon insertion into the corresponding contact socket the second edge engages the retaining member 220 before the edge 122. Engagement with the shallower edge would require less removal force than engagement with the edge 122. As described above, the wires 30 can be connected by engaging only the second, shallower ridges of each of the corresponding contact pins with the corresponding retaining members 220 of the contact sockets. Erroneous connections can be disconnected and reconnected with less removal force than engagement with the edge 122 would require. Once the connections are determined to be correct, the contact pins can be inserted further into the corresponding contact sockets until the retaining members 220 engage the protruding edges 122.

In some examples attachment of the electrical connector assembly 10 onto an electrical cable 20 having multiple electrical wires 30 can be performed as follows. An end portion of exterior insulation 22 can be removed from the cable 20, exposing the ends of the multiple wires 30 of the cable 20. End portions of wire insulation 34 can be removed from each of the wires 30, and the corresponding electrical wire contacts 200 attached to the end of the wires 30 (e.g., by crimping). Each electrical wire contact 200 is engaged with the corresponding electrical connector contact 100, as described above. In some examples, insulating shrink wrap or tubing 37, or other suitable insulating tubing or wrap, can be applied to each of the engaged contact pairs. If employed, in some examples shrink tubing 37 can be positioned around the wires 30 before engagement of the electrical wire contacts 200 with the electrical connector contacts 100, and then moved forward over the engaged contacts and shrunk in place. In some other examples such tubing or wrap can be pre-installed or pre-shrunk.

In some examples a potting material 40 or other electrically insulating medium of any suitable type can be applied within the rear of the connector body 12 to embed each of the electrical wire contacts 200 and at least the engaged portion of the corresponding electrical connector contact 100. In some examples a front seal 14 or a rear seal 16, or both, can be positioned at front and rear portions, respectively, of the connector body 12. Each of the seals 14 or 16 can comprise a resilient, electrically insulating material of any suitable type, and include passages through them. The front ends 104 of the electrical connector contacts 100 can be positioned through the passages of the front seal 14; at least a portion of each electrical wire contact 200 and the end of each corresponding electrical wire 30 can be positioned through the passages of the rear seal 16. The passages of the seals can be arranged in any suitable way, e.g., including internal flanges or protruding nipples.

In some examples the electrical connector assembly 10 can include a flexible, electrically insulating sleeve 50 engaged with a rear portion of the connector body and the end of the exterior insulation 22 of the electrical cable 20. The sleeve 50 can enclose the ends of the electrical wires 30 and each of the electrical wire contacts 200 as well as a rear portion of the connector body 12. In some examples the sleeve can comprise a flexible material overmolded onto the cable 20, wires 30, electrical wire contacts 200, and a rear portion of the connector body 12; in some examples the sleeve 50 can comprise a flexible boot assembled onto the cable 20 and connector body 12, enclosing within the wires 30 and the electrical wire contacts 200. In some examples the electrical connector assembly can include a connector backshell (not shown) having an axial passage therethrough. The backshell can be engaged with a rear portion of the connector body 12 and with the end of the electrical cable 20, with the electrical wires 30 positioned through the axial passage.

In some examples the electrical connector assembly 10 can include one or more electrically insulating lateral spacers 300 (e.g., as in FIGS. 8A-8E, 9A-9F, or 10A 10F). Each lateral spacer 300 can have two or more longitudinal grooves 310 that are each arranged to receive and retain therein a corresponding one of the electrical wire contacts 200. Lateral spacings of the grooves 310 can serve to align the grooves 310, and the corresponding electrical wire contacts 200 retained therein, with corresponding electrical connector contacts 100. The lateral spacers 300 can be arranged with two, three, four, or any suitable number of grooves 310. The lateral spacer 300 can be advantageously employed when pairs of groups of wires 30 are to be connected to corresponding closely spaced electrical connector contacts 100. In some examples twisted pairs of wires 30 can be attached to electrical wire contacts 200 in adjacent grooves 310. In some examples the precise relative positioning of the electrical wire contacts 200 within the grooves 310 of the lateral spacer 300 can enable tighter control of line impedance arising from the relative spatial arrangement of the wires 30 and electrical wire contacts 200. In some examples an electrical shielding member 320 can be incorporated into the spacer 300 to reduce crosstalk between adjacent electrical wire contacts 200.

In addition to the preceding, the following example embodiments fall within the scope of the present disclosure or appended claims. Any given Example below that refers to multiple preceding Examples shall be understood to refer to only those preceding Examples with which the given Example is not inconsistent, and to exclude implicitly those preceding Examples with which the given Example is inconsistent.

Example 1. An electrical connector assembly comprising: (A) a connector body; (B) one or more electrical connector contacts rigidly mounted in the connector body; and (C) one or more electrical wire contacts, wherein: (D) each electrical connector contact includes (i) an intermediate portion structurally arranged to secure the electrical connector contact to the connector body within the electrical connector assembly, (ii) a front end structurally arranged to engage a mating contact of a second, mating electrical connector assembly, and (iii) a rear end structurally arranged to engage a front end of a corresponding one of the electrical wire contacts; (E) each electrical wire contact includes (i) the front end thereof that is structurally arranged to engage the rear end of the corresponding electrical connector contact, and (ii) a rear end structurally arranged for being attached to an end of a corresponding one of multiple electrical wires of an electrical cable; (F) either (i) the rear end of each electrical connector contact comprises a corresponding contact pin and the front end of each electrical wire contact comprises a corresponding contact socket, or (ii) the rear end of each electrical connector contact comprises a corresponding contact socket and the front end of each electrical wire contact comprises a corresponding contact pin; (G) each contact pin includes a shaft portion and a head portion, the head portion having a tapered end and being wider than the shaft portion so as to form a protruding edge where the head portion joins the shaft portion; (H) each contact socket has an open end, is sized and shaped to receive therein the corresponding contact pin through the open end, and includes one or more corresponding resilient retaining members that extend obliquely into and at least partly across the contact socket away from the open end thereof; and (I) each contact pin and each contact socket are arranged so that (i) with the contact pin partially inserted into the corresponding contact socket the head portion deflects the one or more retaining members laterally toward a side of the contact socket, (ii) with the contact pin fully inserted into the corresponding contact socket the one or more retaining members press laterally against the shaft portion of the contact pin, and (iii) corresponding distal edges of the one or more retaining members obstruct withdrawal of the contact pin from the corresponding contact socket by engaging the protruding edge of the contact pin.

Example 2. The electrical connector assembly of Example 1 wherein (i) the one or more electrical connector contacts include multiple electrical connector contacts, and (ii) the one or more electrical wire contacts include multiple electrical wire contacts.

Example 3. The electrical connector assembly of any one of Examples 1 or 2 further comprising the electrical cable including the multiple electrical wires thereof, wherein (i) each electrical wire contact is attached at the rear end thereof to an end of a corresponding one of the electrical wires protruding from an end of exterior insulation of the electrical cable, and (ii) each electrical wire contact is engaged at the front end thereof with the rear end of the corresponding electrical connector contact.

Example 4. The electrical connector assembly of Example 3 further comprising multiple segments of electrically insulating tubing or wrapping, a corresponding segment of the tubing or wrapping enclosing each electrical wire contact and at least a portion of the rear end of the corresponding rear electrical connector contact engaged therewith.

Example 5. The electrical connector assembly of any one of Examples 3 or 4 further comprising an electrically insulating medium embedding each of the electrical wire contacts and at least a portion of the rear end of each corresponding electrical connector contact engaged therewith.

Example 6. The electrical connector assembly of any one of Examples 3 through 5 further comprising one or both of: (i) a front seal comprising a resilient, electrically insulating material with passages through which are positioned the front ends of the electrical connector contacts, or (ii) a rear seal comprising a resilient, electrically insulating material with passages through which are positioned at least a portion of each electrical wire contact and the end of each corresponding electrical wire.

Example 7. The electrical connector assembly of any one of Examples 3 through 6 further comprising a flexible, electrically insulating sleeve engaged with a rear portion of the connector body and the end of the exterior insulation of the electrical cable and enclosing the ends of the electrical wires and each of the electrical wire contacts.

Example 8. The electrical connector assembly of any one of Examples 3 through 7 further comprising a connector backshell having an axial passage therethrough, the backshell being engaged with a rear portion of the connector body and with the end of the electrical cable with the electrical wires positioned through the axial passage.

Example 9. The electrical connector assembly of any one of Examples 3 through 8 further comprising one or more electrically insulating lateral spacers, each lateral spacer having two or more longitudinal grooves each arranged to receive and retain therein a corresponding one of the electrical wire contacts, lateral spacings of the grooves serving to align the grooves and the corresponding electrical wire contacts retained therein with corresponding electrical connector contacts.

Example 10. The electrical connector assembly of any one of Examples 1 through 9 wherein the front end of each electrical connector contact is structurally arranged either (i) as a connector pin of the electrical connector, or (ii) as a connector socket of the electrical connector.

Example 11. The electrical connector assembly of any one of Examples 1 through 10 wherein the rear end of each electrical wire contact is structurally arranged to be crimped onto the end of the corresponding electrical wire.

Example 12. The electrical connector assembly of any one of Examples 1 through 10 wherein the rear end of each electrical wire contact is structurally arranged to be soldered onto the end of the corresponding electrical wire.

Example 13. The electrical connector assembly of any one of Examples 1 through 12 wherein each contact socket includes a corresponding outer sleeve and a corresponding insert portion positioned within the outer sleeve, the insert portion being arranged as an inner sleeve with one or more partially cut-out portions bent across the inner sleeve to form the corresponding one or more obliquely extending retaining members.

Example 14. The electrical connector assembly of any one of Examples 1 through 12 wherein each of the one or more retaining members comprises a discrete mechanical component that is secured within the corresponding contact socket.

Example 15. The electrical connector assembly of any one of Examples 1 through 14 wherein each contact socket includes multiple corresponding retaining members.

Example 16. The electrical connector assembly of any one of Examples 1 through 14 wherein each contact socket includes only a single corresponding retaining member.

Example 17. The electrical connector assembly of any one of Examples 1 through 16 wherein the shaft portion of each contact pin includes a corresponding tapered section that tapers toward the head portion.

Example 18. The electrical connector assembly of any one of Examples 1 through 17 wherein the head portion of each contact pin includes a second protruding edge that is structurally arranged for engaging the corresponding distal edges of the one or more retaining members upon partial insertion of the contact pin into the corresponding contact socket.

Example 19. The electrical connector assembly of Example 18 wherein the second protruding edge is shallower than the protruding edge where the head portion meets the shaft portion.

Example 20. The electrical connector assembly of any one of Examples 1 through 19 wherein structural arrangement of the head portion of each contact pin and the retaining member of each contact socket results in a corresponding audible or tactile cue upon engagement of each retaining member with the corresponding protruding edge of the contact pin.

Example 21. The electrical connector assembly of any one of Examples 1 through 20 wherein structural arrangement of the head portion of each contact pin and the retaining member of each corresponding contact socket enables removal of the contact pin from the contact socket after engagement of the retaining member with the protruding edge of the contact pin by applying a removal force that is less than a force required to separate a corresponding electrical wire from the contact socket attached thereto.

Example 22. An article comprising an electrical connector contact and an electrical wire contact, wherein: (a) the electrical connector contact includes (i) an intermediate portion structurally arranged to secure the electrical connector contact within a first electrical connector assembly, (ii) a front end structurally arranged to engage a mating electrical contact of a second, mating electrical connector assembly, and (iii) a rear end structurally arranged to engage a front end of the electrical wire contact; (b) the electrical wire contact includes (i) the front end thereof that is structurally arranged to engage the rear end of the electrical connector contact, and (ii) a rear end structurally arranged for being attached to an end of an electrical wire; (c) either (i) the rear end of the electrical connector contact comprises a contact pin and the front end of the electrical wire contact comprises a contact socket, or (ii) the rear end of the electrical connector contact comprises the contact socket and the front end of the electrical wire contact comprises the contact pin; (d) the contact pin includes a shaft portion and a head portion, the head portion having a tapered end and being wider than the shaft portion so as to form a protruding edge where the head portion joins the shaft portion; (e) the contact socket has an open end, is sized and shaped to receive therein the contact pin through the open end, and includes one or more resilient retaining members that extend obliquely into and at least partly across the contact socket away from the open end thereof; and (f) the contact pin and the contact socket are arranged so that (i) with the contact pin partially inserted into the contact socket the head portion deflects the one or more retaining members laterally toward a side of the contact socket, (ii) with the contact pin fully inserted into the contact socket the one or more retaining members press laterally against the shaft portion of the contact pin, and (iii) corresponding distal edges of the one or more retaining members obstruct withdrawal of the contact pin from the contact socket by engaging the protruding edge of the contact pin.

Example 23. The article of Example 22 wherein the front end of the electrical connector contact is structurally arranged either (i) as a connector pin of the first electrical connector, or (ii) as a connector socket of the first electrical connector.

Example 24. The article of any one of Examples 22 or 23 wherein the rear end of the electrical wire contact is structurally arranged to be crimped onto the end of the electrical wire.

Example 25. The article of any one of Examples 22 or 23 wherein the rear end of the electrical wire contact is structurally arranged to be soldered onto the end of the electrical wire.

Example 26. The article of any one of Examples 22 through 25 wherein the contact socket includes an outer sleeve and an insert portion positioned within the outer sleeve, the insert portion being arranged as an inner sleeve with one or more partially cut-out portions bent across the inner sleeve to form the one or more obliquely extending retaining members.

Example 27. The article of any one of Examples 22 through 25 wherein each of the one or more retaining members comprises a discrete mechanical component that is secured within the contact socket.

Example 28. The article of any one of Examples 22 through 27 wherein the contact socket includes multiple corresponding retaining members.

Example 29. The article of any one of Examples 22 through 27 wherein the contact socket includes only a single retaining member.

Example 30. The article of any one of Examples 22 through 29 wherein the shaft portion includes a tapered section that tapers toward the head portion.

Example 31. The article of any one of Examples 22 through 30 wherein the head portion of the contact pin includes a second protruding edge, that is structurally arranged for engaging the corresponding distal edges of the one or more retaining members upon partial insertion of the contact pin into the contact socket.

Example 32. The article of Example 31 wherein the second protruding edge is shallower than the protruding edge where the head portion meets the shaft portion.

Example 33. The article of any one of Examples 22 through 32 wherein structural arrangement of the head portion of the contact pin and the retaining member of the contact socket results in an audible or tactile cue upon engagement of the retaining member with the protruding edge of the contact pin.

Example 34. The article of any one of Examples 22 through 33 wherein structural arrangement of the head portion of the contact pin and the retaining member of the contact socket enables removal of the contact pin from the contact socket after engagement of the retaining member with the protruding edge of the contact pin by applying a removal force that is less than a force required to separate a corresponding electrical wire from the contact socket attached thereto.

Example 35. A method for making the electrical connector assembly of any one of Examples 3 through 21, the method comprising, for each wire of electrical cable, engaging the corresponding electrical wire contact with a corresponding one of the electrical connector contacts by inserting the contact pin into the contact socket so that the head portion engages the retaining member.

Example 36. The method of Example 35 further comprising securing each of the electrical connector contacts to the connector body.

Example 37. The method of any one of Examples 35 or 36 further comprising attaching a corresponding one of the electrical wire contacts to each wire of the electrical cable.

Example 38. The method of any one of Examples 35 through 37 further comprising inserting each electrical wire contact into a corresponding longitudinal groove of a corresponding electrically insulating lateral spacer.

Example 39. The method of any one of Examples 35 through 38 further comprising enclosing each electrical wire contact and at least a portion of the rear end of the corresponding rear electrical connector contact engaged therewith in a corresponding segment of electrically insulating tubing or wrapping.

Example 40. The method of any one of Examples 35 through 39 further comprising embedding in an electrically insulating medium each of the electrical wire contacts and at least a portion of the engaged rear end of each corresponding electrical connector contact engaged therewith.

This disclosure is illustrative and not limiting. Further modifications will be apparent to one skilled in the art in light of this disclosure and are intended to fall within the scope of the present disclosure or appended claims. It is intended that equivalents of the disclosed example embodiments and methods, or modifications thereof, shall fall within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Therefore, the present disclosure shall be construed as implicitly disclosing any embodiment having any suitable subset of one or more features—which features are shown, described, or claimed in the present application—including those subsets that may not be explicitly disclosed herein. A "suitable" subset of features includes only features that are neither incompatible nor mutually exclusive with respect to any other feature of that subset. Accordingly, the appended claims are hereby incorporated in their entirety into the Detailed Description, with each claim standing on its own as a separate disclosed embodiment. In addition, each of the appended dependent claims shall be interpreted, only for purposes of disclosure by said incorporation of the claims into the Detailed Description, as if written in multiple dependent form and dependent upon all preceding claims with which it is not inconsistent. It should be further noted that the cumulative scope of the appended claims can, but does not necessarily, encompass the whole of the subject matter disclosed in the present application.

The following interpretations shall apply for purposes of the present disclosure and appended claims. The words "comprising," "including," "having," and variants thereof, wherever they appear, shall be construed as open-ended terminology, with the same meaning as if a phrase such as "at least" were appended after each instance thereof, unless explicitly stated otherwise. The article "a" shall be interpreted as "one or more" unless "only one," "a single," or other similar limitation is stated explicitly or is implicit in the particular context; similarly, the article "the" shall be interpreted as "one or more of the" unless "only one of the," "a single one of the," or other similar limitation is stated explicitly or is implicit in the particular context. The conjunction "or" is to be construed inclusively unless: (i) it is explicitly stated otherwise, e.g., by use of "either . . . or," "only one of," or similar language; or (ii) two or more of the listed alternatives are understood or disclosed (implicitly or explicitly) to be incompatible or mutually exclusive within the particular context. In that latter case, "or" would be understood to encompass only those combinations involving non-mutually-exclusive alternatives. In one example, each of "a dog or a cat," "one or more of a dog or a cat," and "one or more dogs or cats" would be interpreted as one or more dogs without any cats, or one or more cats without any dogs, or one or more of each.

For purposes of the present disclosure or appended claims, when a numerical quantity is recited (with or without terms such as "about," "about equal to," "substantially equal to," "greater than about," "less than about," and so forth), standard conventions pertaining to measurement precision, rounding error, and significant digits shall apply, unless a differing interpretation is explicitly set forth, or if a differing interpretation is implicit or inherent (e.g., some small integer quantities). For null quantities described by phrases such as "equal to zero," "absent," "eliminated," "negligible," "prevented," and so forth (with or without terms such as "about," "substantially," and so forth), each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled. Terms such as "parallel," "perpendicular," "orthogonal," "flush," "aligned," and so forth shall be similarly interpreted (with or without terms such as "about," "substantially," and so forth).

For purposes of the present disclosure and appended claims, any labelling of elements, steps, limitations, or other portions of an embodiment, example, or claim (e.g., first, second, third, etc., (a), (b), (c), etc., or (i), (ii), (iii), etc.) is only for purposes of clarity, and shall not be construed as implying any sort of ordering or precedence of the portions so labelled. If any such ordering or precedence is intended, it will be explicitly recited in the embodiment, example, or claim or, in some instances, it will be implicit or inherent based on the specific content of the embodiment, example, or claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. An electrical connector assembly comprising:

(A) a connector body;

(B) one or more electrical connector contacts rigidly mounted in the connector body; and (C) one or more electrical wire contacts, wherein:

(D) each electrical connector contact includes (i) an intermediate portion structurally arranged to secure the electrical connector contact to the connector body within the electrical connector assembly, (ii) a front end structurally arranged to engage a mating contact of a second, mating electrical connector assembly, and (iii) a rear end structurally arranged to engage a front end of a corresponding one of the electrical wire contacts;

(E) each electrical wire contact includes (i) the front end thereof that is structurally arranged to engage the rear end of the corresponding electrical connector contact, and (ii) a rear end structurally arranged for being attached to an end of a corresponding one of multiple electrical wires of an electrical cable;

(F) either (i) the rear end of each electrical connector contact comprises a corresponding contact pin and the front end of each electrical wire contact comprises a corresponding contact socket, or (ii) the rear end of each electrical connector contact comprises a corresponding contact socket and the front end of each electrical wire contact comprises a corresponding contact pin;

(G) each contact pin includes a shaft portion and a head portion, the head portion having a tapered end and being wider than the shaft portion so as to form a first protruding edge where the head portion joins the shaft portion;

(H) each contact socket has an open end, is sized and shaped to receive therein the corresponding contact pin through the open end, and includes at least a first corresponding resilient retaining member that extends obliquely into and at least partly across the contact socket away from the open end thereof;

(I) each contact pin and each contact socket are arranged so that (i) with the contact pin partially inserted into the corresponding contact socket the head portion deflects the one or more first retaining member laterally toward a side of the contact socket, (ii) with the contact pin fully inserted into the corresponding contact socket the first retaining member presses laterally against the shaft portion of the contact pin, and (iii) a distal edge of the first retaining member obstructs withdrawal of the fully inserted contact pin from the corresponding contact socket by engaging the first protruding edge of the contact pin, and (J) structural arrangement of the head portion of each contact pin and the first retaining member of each corresponding contact socket enables removal of the contact pin from the contact socket, by applying a removal force that is less than a force required to separate the corresponding electrical wire from the corresponding electrical wire contact attached thereto, (i) after engagement of the first retaining member of the contact socket with the first protruding edge of the contact pin, removal being enabled by one or more of size or slope or curvature of the first protruding edge of the contact pin or shape or curvature of the distal edge of the first retaining member, (ii) after engagement, with the contact pin only partially inserted into the contact socket, of a second retaining member of the contact socket with the first protruding edge of the contact pin, the first and second retaining members being located at different longitudinal positions along the contact socket, or (iii) after engagement, with the contact pin only partially inserted into the contact socket, of the first retaining member of the contact socket with a second protruding edge of the contact pin that is shallower than first the protruding edge.

2. The electrical connector assembly of claim 1 wherein (i) the one or more electrical connector contacts include multiple electrical connector contacts, and (ii) the one or more electrical wire contacts include multiple electrical wire contacts.

3. The electrical connector assembly of claim 1 wherein one or more of (i) size or slope or curvature of the protruding edge of each contact pin or (ii) shape or curvature of the distal edge of the first retaining member of the corresponding contact socket enable removal of the fully inserted contact pin from that contact socket by applying a removal force that is less than the force required to separate the corresponding electrical wire from the corresponding electrical wire contact attached thereto.

4. The electrical connector assembly of claim 1 wherein each contact socket includes the second retaining member located at a longitudinal position along the contact socket different from the first retaining member, the second retaining member being structurally arranged for (i) engaging the first protruding edge of the corresponding contact pin upon partial insertion of that contact pin into the contact socket and (ii) enabling removal of the partially inserted contact pin from the contact socket by applying a removal force that is less than the force required to separate the corresponding electrical wire from the corresponding electrical wire contact attached thereto.

5. The electrical connector assembly of claim 1 further comprising the electrical cable including the multiple electrical wires thereof, wherein (i) each electrical wire contact is attached at the rear end thereof to an end of a corresponding one of the electrical wires protruding from an end of exterior insulation of the electrical cable, and (ii) each electrical wire contact is engaged at the front end thereof with the rear end of the corresponding electrical connector contact.

6. The electrical connector assembly of claim 5 further comprising multiple segments of electrically insulating tubing or wrapping, a corresponding segment of the tubing or wrapping enclosing each electrical wire contact and at least a portion of the rear end of the corresponding rear electrical connector contact engaged therewith.

7. The electrical connector assembly of claim 5 further comprising an electrically insulating medium embedding each of the electrical wire contacts and at least a portion of the rear end of each corresponding electrical connector contact engaged therewith.

8. The electrical connector assembly of claim 5 further comprising one or both of: (i) a front seal comprising a resilient, electrically insulating material with passages through which are positioned the front ends of the electrical connector contacts, or (ii) a rear seal comprising a resilient, electrically insulating material with passages through which are positioned at least a portion of each electrical wire contact and the end of each corresponding electrical wire.

9. The electrical connector assembly of claim 5 further comprising a flexible, electrically insulating sleeve engaged with a rear portion of the connector body and the end of the exterior insulation of the electrical cable and enclosing the ends of the electrical wires and each of the electrical wire contacts.

10. The electrical connector assembly of claim 5 further comprising a connector backshell having an axial passage therethrough, the backshell being engaged with a rear portion of the connector body and with the end of the electrical cable with the electrical wires positioned through the axial passage.

11. The electrical connector assembly of claim 5 further comprising one or more electrically insulating lateral spacers, each lateral spacer having two or more longitudinal grooves each arranged to receive and retain therein a corresponding one of the electrical wire contacts, lateral spacings of the grooves serving to align the grooves and the corresponding electrical wire contacts retained therein with corresponding electrical connector contacts.

12. The electrical connector assembly of claim 1 wherein the front end of each electrical connector contact is structurally arranged either (i) as a connector pin of the electrical connector, or (ii) as a connector socket of the electrical connector.

13. The electrical connector assembly of claim 1 wherein the rear end of each electrical wire contact is structurally arranged to be crimped onto the end of the corresponding electrical wire.

14. The electrical connector assembly of claim 1 wherein the rear end of each electrical wire contact is structurally arranged to be soldered onto the end of the corresponding electrical wire.

15. The electrical connector assembly of claim 1 wherein each contact socket includes a corresponding outer sleeve and a corresponding insert portion positioned within the outer sleeve, the insert portion being arranged as an inner sleeve with a least one partially cut-out portion bent across the inner sleeve to form the obliquely extending first retaining member.

16. The electrical connector assembly of claim 1 wherein the first retaining member comprises a discrete mechanical component that is secured within the corresponding contact socket.

17. The electrical connector assembly of claim 1 wherein each contact socket includes multiple corresponding retaining members arranged circumferentially around that contact socket.

18. The electrical connector assembly of claim 1 wherein each contact socket includes only a single corresponding retaining member.

19. The electrical connector assembly of claim 1 wherein the shaft portion of each contact pin includes a corresponding tapered section that tapers toward the head portion.

20. The electrical connector assembly of claim 1 wherein the head portion of each contact pin includes the second protruding edge, that is shallower than the protruding edge where the head portion meets the shaft portion and structurally arranged for (i) engaging the corresponding distal edge of the first retaining member upon partial insertion of the contact pin into the corresponding contact socket and (ii) enabling removal of the partially inserted contact pin from the corresponding contact socket by applying a removal force that is less than the force required to separate the corresponding electrical wire from the corresponding electrical wire contact attached thereto.

21. The electrical connector assembly of claim 1 wherein structural arrangement of the head portion of each contact pin and the first retaining member of each contact socket results in a corresponding audible or tactile cue upon engagement of the first retaining member of the contact socket with the first protruding edge of the contact pin.

22. An article comprising an electrical connector contact and an electrical wire contact, wherein:

(a) the electrical connector contact includes (i) an intermediate portion structurally arranged to secure the electrical connector contact within a first electrical connector assembly, (ii) a front end structurally arranged to engage a mating electrical contact of a second, mating electrical connector assembly, and (iii) a rear end structurally arranged to engage a front end of the electrical wire contact;

(b) the electrical wire contact includes (i) the front end thereof that is structurally arranged to engage the rear end of the electrical connector contact, and (ii) a rear end structurally arranged for being attached to an end of an electrical wire;

(c) either (i) the rear end of the electrical connector contact comprises a contact pin and the front end of the electrical wire contact comprises a contact socket, or (ii) the rear end of the electrical connector contact comprises the contact socket and the front end of the electrical wire contact comprises the contact pin;

(d) the contact pin includes a shaft portion and a head portion, the head portion having a tapered end and being wider than the shaft portion so as to form a first protruding edge where the head portion joins the shaft portion;

(e) the contact socket has an open end, is sized and shaped to receive therein the contact pin through the open end, and includes at least a first resilient retaining member that extends obliquely into and at least partly across the contact socket away from the open end thereof;

(f) the contact pin and the contact socket are arranged so that (i) with the contact pin partially inserted into the contact socket the head portion deflects the first retaining member laterally toward a side of the contact socket, (ii) with the contact pin fully inserted into the contact socket the first retaining member presses laterally against the shaft portion of the contact pin, and (iii) a distal edge of the first retaining member obstructs withdrawal of the fully inserted contact pin from the contact socket by engaging the first protruding edge of the contact pin; and (g) structural arrangement of the head portion of the contact pin and the first retaining member of the contact socket enables removal of the contact pin from the contact socket, by applying a removal force that is less than a force required to separate the electrical wire from the electrical wire contact attached thereto, (i) after engagement of the first retaining member of the contact socket with the first protruding edge of the contact pin, removal being enabled by one or more of size or slope or curvature of the first protruding edge of the contact pin or shape or curvature of the distal edge of the first retaining member, (ii) after engagement, with the contact pin only partially inserted into the contact socket, of a second retaining member of the contact socket with the first protruding edge of the contact pin, the first and second retaining members being located at different longitudinal positions along the contact socket, or (iii) after engagement, with the contact pin only partially inserted into the contact socket, of the first retaining member of the contact socket with a second protruding edge of the contact pin that is shallower than first the protruding edge.

23. The article of claim 22 wherein the front end of the electrical connector contact is structurally arranged either (i) as a connector pin of the first electrical connector, or (ii) as a connector socket of the first electrical connector.

24. The article of claim 22 wherein the rear end of the electrical wire contact is structurally arranged to be crimped onto the end of the electrical wire.

25. The article of claim 22 wherein the rear end of the electrical wire contact is structurally arranged to be soldered onto the end of the electrical wire.

26. The article of claim 22 wherein the contact socket includes an outer sleeve and an insert portion positioned within the outer sleeve, the insert portion being arranged as an inner sleeve with at least one partially cut-out portion bent across the inner sleeve to form the obliquely extending first retaining member.

27. The article of claim 22 wherein the first retaining member comprises a discrete mechanical component that is secured within the contact socket.

28. The article of claim 22 wherein the contact socket includes multiple corresponding retaining members arranged circumferentially around that contact socket.

29. The article of claim 22 wherein the contact socket includes only a single retaining member.

30. The article of claim 22 wherein the shaft portion includes a tapered section that tapers toward the head portion.

31. The article of claim 22 wherein the head portion of the contact pin includes the second protruding edge that is shallower than the protruding edge where the head portion meets the shaft portion and structurally arranged for (i) engaging the corresponding distal edge of the first retaining member upon partial insertion of the contact pin into the contact socket and (ii) enabling removal of the partially inserted contact pin from the contact socket by applying a removal force that is less than the force required to separate the electrical wire from the electrical wire contact attached thereto.

32. The article of claim 22 wherein structural arrangement of the head portion of the contact pin and the first retaining member of the contact socket results in an audible or tactile cue upon engagement of the first retaining member of the contact socket with the first protruding edge of the contact pin.

33. The article of claim 22 wherein one or more of (i) size or slope or curvature of the first protruding edge of the contact pin or (ii) shape or curvature of the distal edge of the first retaining member of the contact socket enable removal of the fully inserted contact pin from the contact socket by applying a removal force that is less than the force required to separate the electrical wire from the electrical wire contact attached thereto.

34. The article of claim 22 wherein the contact socket includes the second retaining member located at a longitudinal position along the contact socket different from the first retaining member, the second retaining member being structurally arranged for (i) engaging the first protruding edge of the contact pin upon partial insertion of the contact pin into the contact socket and (ii) enabling removal of the partially inserted contact pin from the contact socket by applying a removal force that is less than the force required to separate the electrical wire from the electrical wire contact attached thereto.

* * * * *